(12) United States Patent
Trundle

(10) Patent No.: US 12,243,313 B2
(45) Date of Patent: Mar. 4, 2025

(54) VIRTUAL SENSORS

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 392 days.

(21) Appl. No.: 17/824,182

(22) Filed: May 25, 2022

(65) Prior Publication Data

US 2022/0284708 A1 Sep. 8, 2022

Related U.S. Application Data

(63) Continuation of application No. 17/168,939, filed on Feb. 5, 2021, now Pat. No. 11,354,908, which is a
(Continued)

(51) Int. Cl.
*G06V 20/52* (2022.01)
*G08B 13/08* (2006.01)
(Continued)

(52) U.S. Cl.
CPC .............. *G06V 20/52* (2022.01); *G08B 13/08* (2013.01); *G08B 13/19663* (2013.01); *G08B 13/19684* (2013.01); *G08B 13/19695* (2013.01); *H04N 7/18* (2013.01); *H04N 7/188* (2013.01); *G06V 20/44* (2022.01); *G08B 13/19656* (2013.01); *G08B 13/19667* (2013.01); *G08B 17/125* (2013.01); *G08B 29/046* (2013.01); *G08B 29/185* (2013.01)

(58) Field of Classification Search
CPC ........ G06V 20/52; G06V 20/44; G08B 13/08; G08B 13/19663; G08B 13/19684; G08B 13/19695; G08B 13/19656; G08B 13/19667; G08B 17/125; G08B 29/046; G08B 29/185; H04N 7/18; H04N 7/188
See application file for complete search history.

(56) References Cited

U.S. PATENT DOCUMENTS 6,970,183 B1 11/2005 Monroe
9,064,394 B1 6/2015 Trundle
(Continued)

*Primary Examiner* — Jeffery A Williams
*Assistant Examiner* — Tyler B Edwards
(74) *Attorney, Agent, or Firm* — Fish & Richardson P.C.

(57) ABSTRACT

Virtual sensor technology, in which a camera is controlled to capture at least one configuration image of an area monitored by a monitoring system and input is received that defines one or more characteristics of the at least one configuration image that enable sensing of an event in the area. Based on the received input, configuration data used in sensing the event is generated and stored. After storage of the configuration data, the camera is controlled to capture one or more images of the area, the one or more images are analyzed based on the configuration data, and occurrence of the event is detected based on the analysis of the one or more images. Based on detecting occurrence of the event, a transmitting device is controlled to send, to a controller of the monitoring system, a signal that indicates the detection of the occurrence of the event.

20 Claims, 14 Drawing Sheets

Related U.S. Application Data continuation of application No. 16/459,527, filed on Jul. 1, 2019, now Pat. No. 10,915,758, which is a continuation of application No. 15/606,667, filed on May 26, 2017, now Pat. No. 10,339,388, which is a continuation of application No. 14/745,856, filed on Jun. 22, 2015, now Pat. No. 9,665,778, which is a continuation of application No. 13/529,629, filed on Jun. 21, 2012, now Pat. No. 9,064,394.

(60) Provisional application No. 61/499,917, filed on Jun. 22, 2011.

(51) Int. Cl.
*G08B 13/196* (2006.01)
*H04N 7/18* (2006.01)
*G06V 20/40* (2022.01)
*G08B 17/12* (2006.01)
*G08B 29/04* (2006.01)
*G08B 29/18* (2006.01)

(56) References Cited

U.S. PATENT DOCUMENTS

| | | |
|---|---|---|
| 2005/0111696 A1 | 5/2005 | Baer |
| 2006/0093190 A1* | 5/2006 | Cheng .................. G06V 10/811 |
| | | 340/5.83 |
| 2007/0024707 A1 | 2/2007 | Brodsky |
| 2007/0262857 A1 | 11/2007 | Jackson |
| 2008/0136910 A1* | 6/2008 | Berkey .............. G05B 19/4062 |
| | | 348/143 |
| 2009/0249387 A1 | 10/2009 | Magdy et al. |
| 2011/0043689 A1 | 2/2011 | Cobb et al. |

* cited by examiner

10A
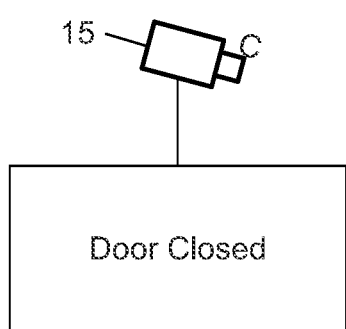
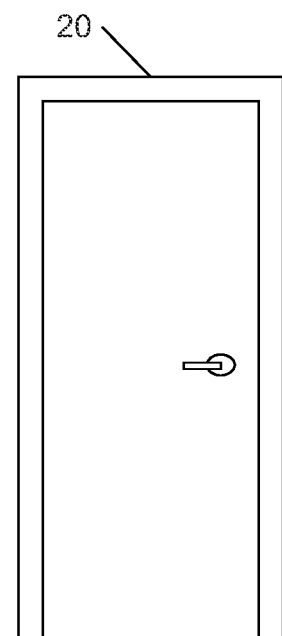
10B
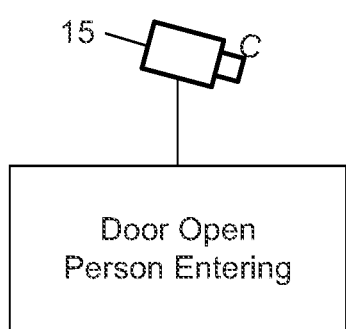
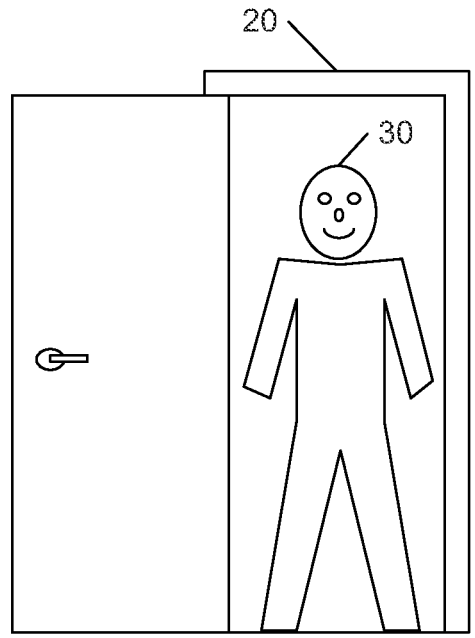
FIG. 1A

600A
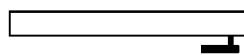  Door Closed Configuration Image
600B
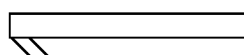  Door Open 45° Configuration Image
600C
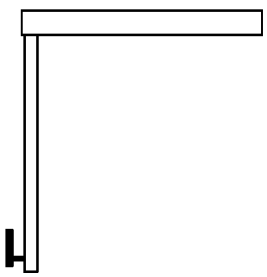  Door Open 90° Configuration Image
600D
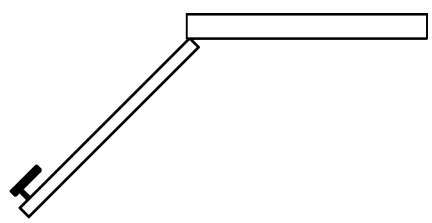  Door Open 135° Configuration Image
600E
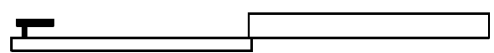  Door Open 180° Configuration Image
FIG. 6

1100

| Sensor | Rule |
|---|---|
| Front Door Sensor | System Armed Away – Check Every 2 Seconds<br>System Armed Stay – Check Every Second |
| Medicine Cabinet Sensor | Start - Bedroom Occupancy Detected Through Motion/Door Sensor<br>Stop - Bedroom Vacancy Detected Through Motion/Door Sensor |
| Outdoor Motion Sensor | 7AM to 8PM – Alarm Condition Detected<br>8PM to 7AM – Any State |
| Smoke Sensor | Always |
| Secondary Smoke Sensor | Start - Smoke Sensor Detects Smoke or Has An Error<br>Stop - Smoke Sensor Does Not Detect Smoke and No Error |

FIG. 11

VIRTUAL SENSORS

CROSS REFERENCE TO RELATED APPLICATIONS

This application is a continuation of U.S. application Ser. No. 17/168,939, filed Feb. 5, 2021, which is a continuation of U.S. application Ser. No. 16/459,527, filed Jul. 1, 2019, which is a continuation of U.S. application Ser. No. 15/606,667, filed May 26, 2017, which is a continuation of U.S. application Ser. No. 14/745,856, filed Jun. 22, 2015, which is a continuation of U.S. application Ser. No. 13/529,629, filed Jun. 21, 2012, which claims the benefit of U.S. Provisional application Ser. No. 61/499,917, filed Jun. 22, 2011. All of these prior applications are incorporated herein by reference in their entirety for all purposes.

TECHNICAL FIELD

This disclosure relates to virtual sensor and monitoring technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for virtual sensor and monitoring technology.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 1A and 1B illustrate an example of an image sensor configured as a door sensor.

FIGS. 5-7 illustrate examples of characteristics of configuration images that are used in sensing events.

FIG. 11 illustrates example rules that define a capture pattern for when an image sensor is scheduled to monitor for events within captured images.

DETAILED DESCRIPTION

Techniques are described for virtual sensors for a home monitoring (e.g., security) system. The virtual sensors may be configured as any of multiple, different types of sensors (e.g., door sensor, motion sensor, smoke sensor, etc.) typically employed as separate physical devices in a home security system. The virtual sensor is configured for its intended purpose based on user input and learned behavior of the property the virtual sensor is being configured to sense.

Figure 1B:
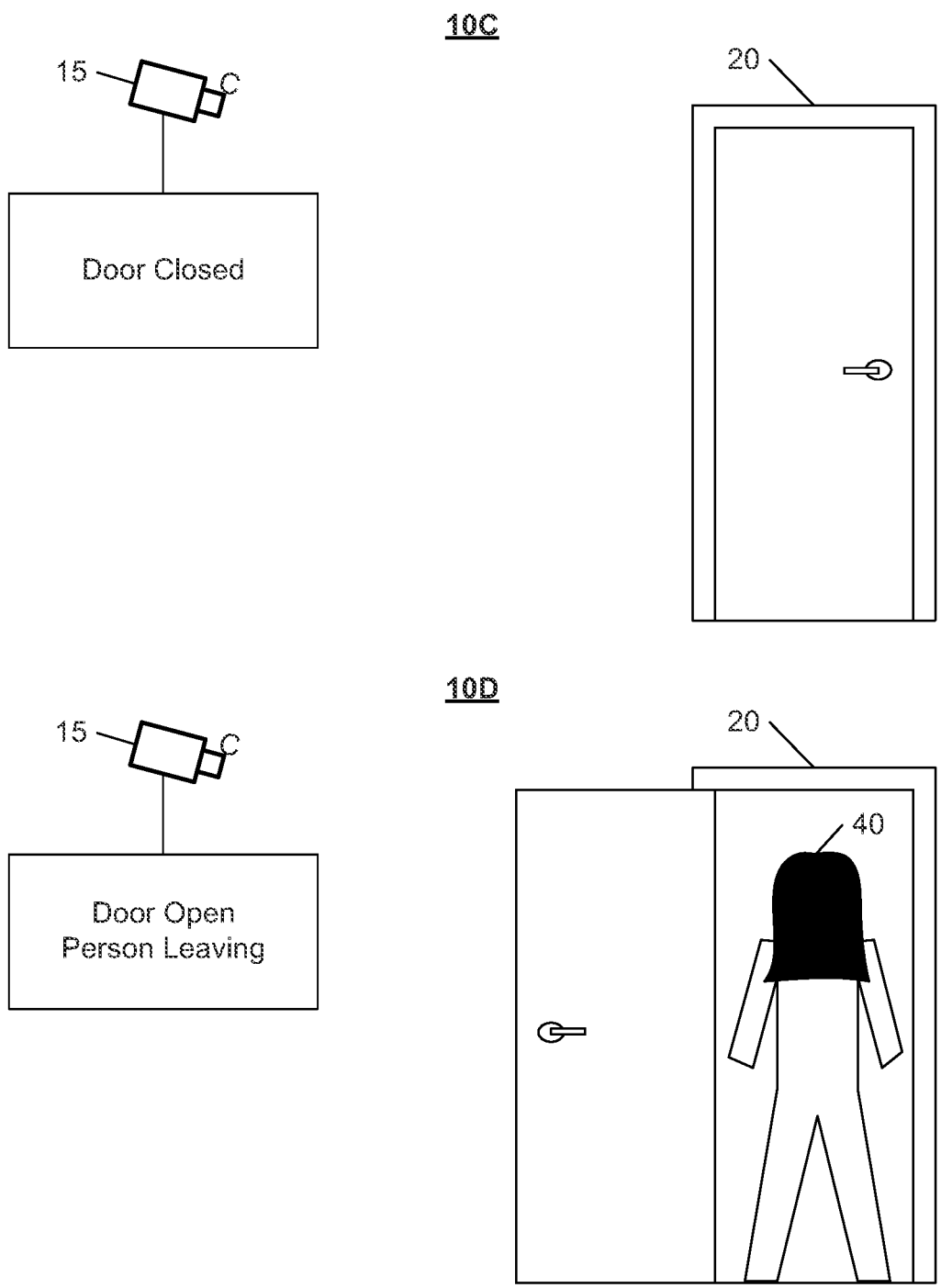

FIGS. 1A and 1B illustrate an example of an image sensor configured to detect a custom event. As shown in FIG. 1A, at a first time 10A, an image sensor 15 detects a door 20 being oriented in a closed position based on one or more images captured by the image sensor 15. The image sensor 15 is able to detect the door 20 being oriented in a closed position because the image sensor 15 was previously configured to operate as a door sensor. For instance, during configuration, an installer positioned the image sensor 15 in a location in which the door 20 is present within a field of view of the image sensor 15. After positioning, the image sensor 15 receives a command from the installer to enter learn mode.

In learn mode, the image sensor 15 captures one or more configuration images of the door 20 and receives input provided by the installer that enables the image sensor 15 to detect when the door 20 is oriented in a closed position based on analysis of images captured by the image sensor 15. For instance, the image sensor 15 receives input identifying one or more configuration images that show the door 20 oriented in a closed position and stores data from the one or more configuration images that allows the image sensor 15 to detect whether or not the door 20 is oriented in a closed position based on a new image captured by the image sensor 15. The image sensor 15 also may receive input defining a position of the door 20 within the one or more configuration images and a position of one or more anchor points within the one or more configuration images that the image sensor 15 may use to determine a frame of reference.

Based on the one or more configuration images and the input received in learn mode, the image sensor 15 generates and stores configuration data that allows the image sensor 15 to determine whether or not the door 20 is oriented in a closed position. The configuration data may include an image (or portion thereof) of the door 20 oriented in a closed position and/or data identifying a location in images captured by the image sensor 15 where features of the door 20 are located when the door 20 is oriented in a closed position. The image sensor 15 then detects whether or not the door 20 is oriented in a closed position by comparing a current captured image with the image of the door 20 oriented in a closed position and/or by determining whether or not features of the door 20 are found at the locations where features of the door 20 are located when the door 20 is oriented in a closed position.

At the first time 10A, the image sensor 15 captures an image of the door 20, analyzes the captured image based on the stored configuration data, and detects the door 20 being oriented in a closed position based on the analysis. The image sensor 15 may store this result and continue monitoring captured images of the door 20 to detect when the door 20 is opened. The image sensor 15 also may report the result to a controller of a monitoring system that monitors the property where the door 20 is located. In this regard, the image sensor 15 may use the same signal used by a traditional contact door sensor such that the image sensor 15 can replace a traditional door sensor and be retrofitted into the monitoring system without requiring modification of the controller of the monitoring system.

At a second time 10B that is after the first time 10A, the image sensor 15 captures an image of the door 20, analyzes the captured image based on the stored configuration data, and detects the door 20 being oriented in an open position based on the analysis. The image sensor 15 may store this result and report the result to the controller of the monitoring system that monitors the property where the door 20 is located. As with a door closed signal, the image sensor 15 may use the same door open signal used by a traditional contact door sensor such that the image sensor 15 can replace a traditional door sensor and be retrofitted into the monitoring system without requiring modification of the controller of the monitoring system.

In addition, the image sensor 15 may trigger additional processing of one or more images of the door 20 (e.g., one or more images of an area near the door 20 with the door 20 being a part of the field of view) based on detection of the door 20 being oriented in an open position. The additional processing may be performed to identify additional information about the door open event that is not capable of being captured by a traditional contact door sensor. For example, the image sensor 15 may analyze the one or more images of the door 20 to detect a person or a person's face in the one or more images, which may include the image used in detecting the door open event and/or one or more images captured before or after detection of the door open event. In this example, during configuration, the image sensor 15 had detection processes (e.g., body or facial detection processes) loaded to the image sensor 15 for use in identifying additional characteristics of a door open event. The image sensor 15 also receives input defining where and/or how the detection processes are applied to captured images and generates configuration data that enables the image sensor 15 to detect characteristics that an owner of the monitoring system is interested in using for monitoring purposes.

Because the image sensor 15 is flexible, the image sensor 15 may be configured to detect any characteristics that are capable of being detected through image data. For instance, the image sensor 15 may be configured to detect whether a person entered the property through the door 20 during the door open event, detect whether a person exited the property through the door 20 during the door open event, and detect whether a person opened the door 20 from inside the property and remained in the property during the door open event. In addition, the image sensor 15 may detect a number of persons associated with the door open event and may use facial recognition processes to identify a specific person associated with the door open event or to determine that the person associated with the door open event is unknown. The image sensor 15 may detect any combination of the characteristics described throughout this disclosure and any other biometric characteristics that are capable of being detected through image analysis (e.g., size, gender, etc.). Because the image sensor 15 is capable of detecting a door open event as well as additional characteristics that are descriptive of the door open event, the image sensor 15 is able to provide more information than a traditional door sensor and, therefore, enables the monitoring system to perform more intelligent or complex actions based on door open events.

In the example shown in FIGS. 1A and 1B, the image sensor 15 has been configured as an intelligent door sensor that detects door opening and closing events and also detects whether a person entered the property through the door 20 during the door open event, whether a person exited the property through the door 20 during the door open event, and whether a person opened the door 20 from inside the property and remained in the property during the door open event. In this regard, at the second time 10B, the image sensor 15 detects the door open event and begins processing to determine whether a person entered the property through the door 20 during the door open event, whether a person exited the property through the door 20 during the door open event, and whether a person opened the door 20 from inside the property and remained in the property during the door open event. For instance, in response to detecting the door open event, the image sensor 15 begins analyzing an area of one or more captured images within the frame of the door 20 to detect a person associated with the door open event. After detecting the person associated with the door open event, the image sensor 15 analyzes a head of the detected person to determine whether facial features (e.g., eyes, nose, mouth, etc.) are present in the one or more captured images. The image sensor 15 determines that a person entered the property through the door 20 during the door open event based on a determination that facial features are present in the one or more captured images and the person remained in the property after the image sensor detected the door 20 being closed. The image sensor 15 determines that a person exited the property through the door 20 during the door open event based on a determination that facial features are absent in the one or more captured images and the person did not remain in the property after the image sensor detected the door 20 being closed. The image sensor 15 determines that a person opened the door 20 from inside the property and remained in the property during the door open event based on a determination that facial features are absent in the one or more captured images and the person remained in the property after the image sensor detected the door 20 being closed.

As shown in FIG. 1A, at the second time 10B, the image sensor 15 detects a person 30 in the frame of the door 20. Based on detecting the person, the image sensor 15 analyzes one or more images of the person 30 for facial features and determines that facial features are present in the one or more captured images. At this point, the image sensor 15 may determine that the person 30 entered the property through the door 20 during the door open event and provide output to the controller of the monitoring system indicating that a person entered the property through the door 20 during the door open event. Alternatively, the image sensor 15 may continue to monitor images of the door 20 to determine whether the person 30 remained in the property after the image sensor detected the door 20 being closed. This additional analysis may provide a more accurate result, but is slower than immediately determining that a person entered the property through the door 20 based on detecting facial features.

Based on determining that the person 30 entered the property through the door 20 during the door open event, the image sensor 15 may store this result and report the result to the controller of the monitoring system that monitors the property where the door 20 is located. The image sensor 15 may first report the door open event as a primary event and then report the determination that the person 30 entered the property through the door 20 during the door open event as a secondary event that provides additional information about the primary, door open event. Alternatively, the image sensor 15 may detect the door open event, wait until the determination that the person 30 is entering the property has been made, and then report the detections as a single event that indicates door open with person entering.

The controller of the monitoring system receives the reports from the image sensor 15 and performs monitoring and/or home automation operations based on the reports. In the example shown at the second time 10B, the controller of the monitoring system takes action in response to the image sensor 15 detection of the door open event with person entering the property. For instance, the controller of the monitoring system may take action to perform home automation operations that prepare the property for occupancy of the person 30 entering the property. The home automation operations that prepare the property for occupancy may include turning on lights within the property, setting a thermostat at an appropriate temperature, controlling an oven to start preheating, and/or any other type of home automation operation that monitoring systems are capable of controlling.

In addition, the controller of the monitoring system may perform security monitoring based on the door open event with the additional information that a person is entering the property. For instance, if the monitoring system is armed in a "STAY" setting at the second time 10B when the door open event is detected, the controller of the monitoring system may immediately sound an alarm and alert an offsite monitoring station because a person should not be entering the property when the monitoring system is armed in the "STAY" setting. Any other types of monitoring and/or home automation features may be controlled based on the additional information provided with the door open event.

FIG. 1B shows the door 20 oriented in a closed position at a third time 10C that is after the second time 10B. At the third time 10C, the image sensor 15 captures an image of the door 20, analyzes the captured image based on the stored configuration data, and detects the door 20 being oriented in a closed position based on the analysis. The image sensor 15 may store this result and continue monitoring captured images of the door 20 to detect when the door 20 is opened. The image sensor 15 also may report the result to the controller of the monitoring system that monitors the property where the door 20 is located.

At a fourth time 10D that is after the third time 10C, the image sensor 15 captures an image of the door 20, analyzes the captured image based on the stored configuration data, and detects the door 20 being oriented in an open position based on the analysis. The image sensor 15 may store this result and report the result to the controller of the monitoring system that monitors the property where the door 20 is located.

In response to detecting the door open event, the image sensor 15 begins processing to determine whether a person entered the property through the door 20 during the door open event, whether a person exited the property through the door 20 during the door open event, and whether a person opened the door 20 from inside the property and remained in the property during the door open event. At the fourth time 10D, the image sensor 15 detects a person 40 in the frame of the door 20. Based on detecting the person, the image sensor 15 analyzes one or more images of the person 40 for facial features and determines that facial features are absent in the one or more captured images. At this point, the image sensor 15 may determine that the person 40 exited the property through the door 20 during the door open event and provide output to the controller of the monitoring system indicating that a person exited the property through the door 20 during the door open event. Alternatively, the image sensor 15 may continue to monitor images of the door 20 to determine whether the person 40 remained in the property or left the property after the image sensor detected the door 20 being closed. This additional analysis may provide a more accurate result and enables detection of a person exiting, as well as detection of a person opening the door 20 and remaining in the property.

Based on determining that the person 40 exited the property through the door 20 during the door open event, the image sensor 15 may store this result and report the result to the controller of the monitoring system that monitors the property where the door 20 is located. The image sensor 15 may first report the door open event as a primary event and then report the determination that the person 40 exited the property through the door 20 during the door open event as a secondary event that provides additional information about the primary, door open event. Alternatively, the image sensor 15 may detect the door open event, wait until the determination that the person 40 is exiting the property has been made, and then report the detections as a single event that indicates door open with person leaving.

The controller of the monitoring system receives the reports from the image sensor 15 and performs monitoring and/or home automation operations based on the reports. In the example shown at the fourth time 10D, the controller of the monitoring system takes action in response to the image sensor 15 detection of the door open event with person leaving the property. For instance, the controller of the monitoring system may take action to perform home automation operations that are appropriate for times when the property is unoccupied. The home automation operations that are appropriate for times when the property is unoccupied may include turning off lights within the property, setting a thermostat at an appropriate temperature to conserve energy, controlling appliances to turn off, and/or any other type of home automation operation that monitoring systems are capable of controlling.

In addition, the controller of the monitoring system may perform security monitoring based on the door open event with the additional information that a person is exiting the property. For instance, if the monitoring system is armed in a "STAY" setting at the fourth time 10D when the door open event is detected, the controller of the monitoring system may delay sounding an alarm and delay alerting an offsite monitoring station because the person 40 likely accidentally forgot to disarm the monitoring system prior to opening the door 20. In this regard, the controller of the monitoring system may provide, to the person 40, an alert (e.g., a beep, electronic message, etc.) that is less distributive than the alarm (e.g., siren) and that asks the person 40 to disarm the monitoring system because the monitoring system was armed in the "STAY" setting when the person 40 exited the property through the door 20. If the controller of the monitoring system receives input needed to disarm the monitoring system within a threshold period of time, the controller of the monitoring system disarms the monitoring system and a false alarm is avoided. If the controller of the monitoring system does not receive input needed to disarm the monitoring system within the threshold period of time, the controller of the monitoring system sounds an alarm and alerts an offsite monitoring station. Any other types of monitoring and/or home automation features may be controlled based on the additional information provided with the door open event.

Figure 2:
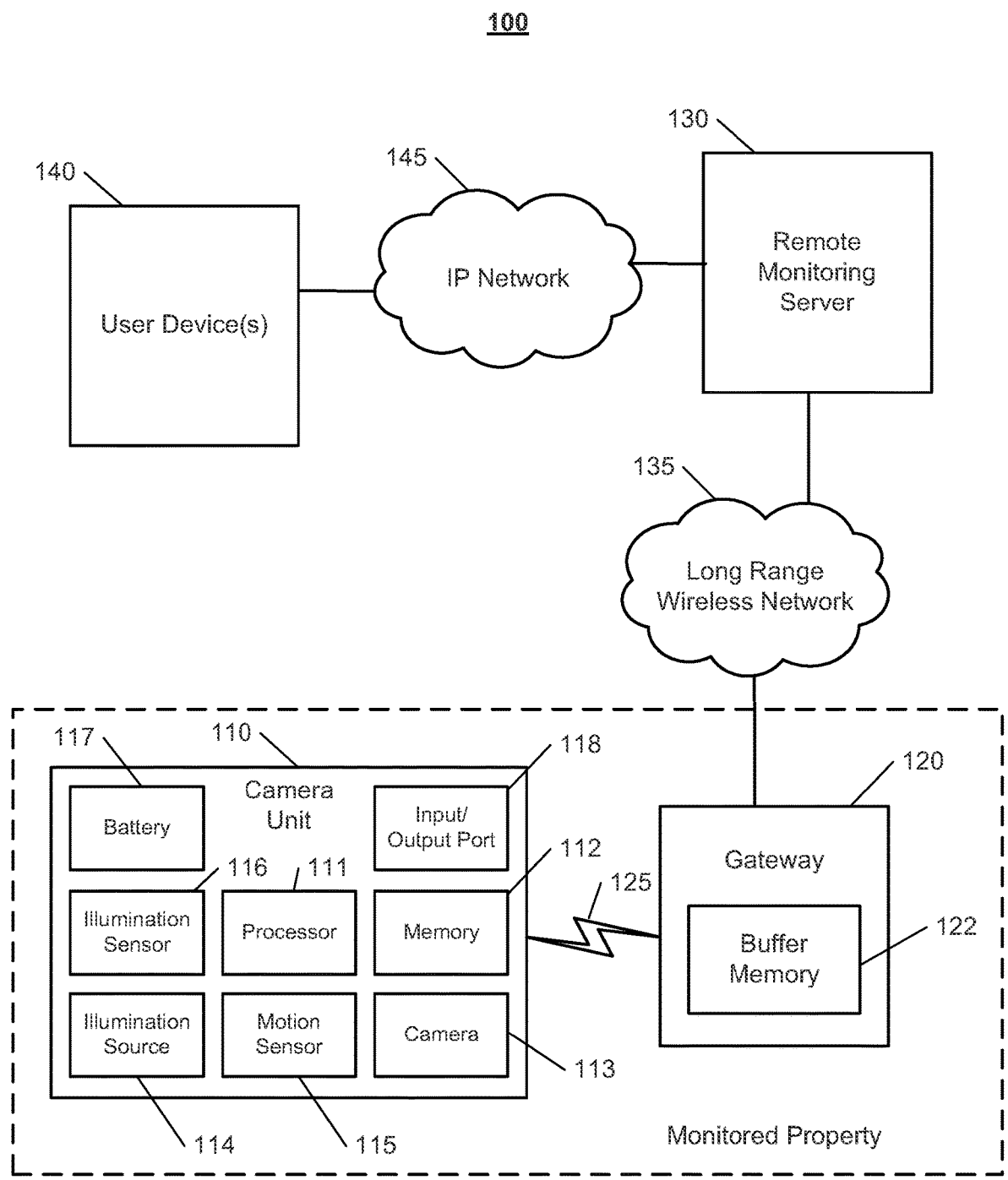
FIGS. 2 and 3 illustrate example systems.

FIG. 2 illustrates an example of an electronic system 100 configured to provide image surveillance and virtual sensing. The system 100 includes a camera unit 110, a gateway 120, a remote monitoring server 130, and one or more user devices 140. The camera unit 110 is a relatively small and affordable unit that captures still images of an area that corresponds to a location of the camera unit. Because the camera unit 110 is relatively small, runs off of battery power, and communicates via a wireless communication protocol, the camera unit 110 may be easily placed at any location within a monitored property (or just outside of a monitored property) to provide image surveillance of an area of the monitored property (or an area just outside of the monitored property).

The camera unit 110 includes a processor 111, a memory 112, a camera 113, an illumination source 114, a motion sensor 115, an illumination sensor 116, a battery 117, and an input/output port 118. The processor 111 controls operations of the camera unit 110 and may be any suitable processor. The memory 112 stores instructions that are executed by the processor 111 and also stores images captured by the camera 113. The memory 112 may be any type of memory that is capable storing data and may include a combination of multiple, memory units. For example, the memory 112 may be a Flash memory component that stores both instructions that are executed by the processor and images captured by the camera 113.

The camera 113 captures images of an area proximate to where the camera unit is located. For instance, the camera 113 may be placed at an upper corner of a room in a building and, in this instance, the camera 113 captures images of the room. The camera 113 may be a video/photographic camera or other type of optical sensing device configured to capture images. In some implementations, the camera 113 is a CMOS camera sensor (or other CCD sensor) that captures images at various, different resolutions. For instance, the CMOS camera sensor may capture up to 640×480 pixels (e.g., VGA resolution). The camera 113 also may capture a lower resolution image (e.g., Quarter VGA=QVGA=320× 240 pixels).

The illumination source 114 may be any source of illumination that improves capturing of images in a dark area. For example, the illumination source 114 may include one or more Infra Red LEDs that emit Infra Red light over an area within a field of view of the camera 113 to illuminate objects within the area. The processor 111 may control the illumination source 114 to emit light when the illumination sensor 116 detects a level of light that is below a threshold level.

The motion sensor 115 may be Passive Infra Red (PIR) motion sensor, a microwave motion sensor, or any type of sensor that detects motion in an area corresponding to a field of view of the camera 113. The processor 111 may monitor output of the motion sensor 115 and trigger the camera 113 to capture images in response to the motion sensor 115 detecting motion in the area corresponding to the field of view of the camera 113.

The battery 117 is the power source of the camera unit 110 and may be any type of battery capable of delivering power to the camera unit 110. The battery 117 may have a relatively small size and may be a standard type of battery available for purchase at retail stores. The battery 117 may be located in a compartment that is easily accessible to a user of the camera unit 110 to facilitate changing of the battery 117, which may occur relatively frequently (e.g., every couple of months) depending on the power consumption and image capture settings of the camera unit 110.

The input/output port 118 is a communication interface through which the camera unit may send and receive wireless communications. The input/output port 118 may, using a short range wireless protocol (e.g., Bluetooth, Z-Wave, ZigBee, local wireless 900 MHz communication band, etc.), receive and send short range wireless communications with other devices, such as the gateway 120. The input/output port 118 may include a "normally open" or "normally closed" digital input that can trigger capture of images using the camera 113.

In some implementations, the camera unit 110 may include a thermocouple input and/or a built-in thermocouple at the camera unit 110. The built-in thermocouple may be located in a top rear of the camera unit 110 away from other heat emitting parts of the camera unit 110. In these implementations, the camera unit 110 may report anytime measured temperatures exceed thresholds, and also may report temperature data that can be used to compliment thermostat temperature data. For example, from thermocouple measurements, the system 100 may determine that temperature in a room with a thermostat is hotter or colder than temperature in another room by a meaningful amount. In this example, the system 100 may determine that a heating or cooling system is operating with relatively low efficiency based on a determination that temperature in a room is hotter or colder than temperature in another room by a meaningful amount. The system 100 may send an alert to a user when inefficient operation of the heating or cooling system is detected.

To reduce processing power needed and to conserve battery life, the processor 111 may control components of the camera unit 110 to periodically enter sleep mode operation. For example, the processor 111 may awaken every second to determine whether any communications have been received at the input/output port 118. If no communications have been received, the processor 111 may place itself and other components (e.g., the memory 112, the camera 113, etc.) in a sleep mode for another second before awaking again to determine whether any communications have been received at the input/output port 118. The processor 111 also may awaken from a sleep mode state based on output from the motion sensor 115 indicating that motion has been detected.

In some implementations, the processor 111 of the camera unit 110 conserves battery power and costs of data transmission by analyzing reduced resolution versions of images captured by the camera 113 for relevant or interesting activity before sending the images to the gateway 120. In these implementations, the processor 111 may wait for an event detected by the motion sensor 115 and, in response to the event, control the camera 113 to capture a full resolution image (e.g., VGA resolution at 640×480 pixels). The processor 111 then extracts reduced resolution luminance data from the full resolution image (e.g., 80×60 pixels for 4800 data points) and searches the reduced resolution luminance data for motion that is limited roughly to a quarter of the total image area. If the processor 111 finds motion that is limited roughly to a quarter of the total image area, the processor 111 extracts the QVGA region from the original, full resolution VGA image and sends only that portion to the gateway 120. If the processor 111 does not find motion that is limited roughly to a quarter of the total image area, the processor 111 analyzes any motion within the total image area to determine whether the motion is indicative or relevant/interesting activity. If the processor 111 determines that the motion is indicative or relevant/interesting activity, the processor 111 sends the QVGA version of the full image to the gateway 120. If the processor 111 determines that no motion exists or the motion is not indicative or relevant/interesting activity, the processor 111 discards the image without transmitting it to the gateway 120.

In some examples, the camera unit 110 offers plug and play installation, where the gateway 120 dynamically discovers the camera unit 110 and begins interacting with the camera unit 110. The camera unit 110 also may be controlled locally through a local control input device (e.g., an on/off button or a capture image button) or a gesture. For instance, a user may perform a gesture in front of the camera unit 110 to control the camera unit 110 to enter an off state in which images are not captured.

In some implementations, the camera unit 110 may include tamper alert mechanisms. In these implementations, the camera unit 110 may analyze images captured by the camera unit 110 to determine whether the camera has been covered. For instance, the camera unit 110 may detect covering when several captured images are completely dark (or entirely a single color) when the illumination sensor 116 indicates that the area within the field of view of the camera 113 is illuminated or the illumination source 114 was used when the images were captured. Further, the camera unit 110 may include an accelerometer that detects movement of the camera unit 110 or may detect movement of the camera unit 110 based on images captured by the camera unit 110. The camera unit 110 may send an alert to the gateway 120 when the camera unit 110 detects covering or movement and the gateway 120 may relay the alert to the remote monitoring server 130 so that action to address the potential tampering can be taken.

The gateway 120 is a communication device configured to exchange short range wireless communications with the camera unit 110 over the communication link 125 and long range wireless communications with the remote monitoring server 130 over the network 135. Because the gateway 120 exchanges short range wireless communications with the camera unit 110, the gateway 120 is positioned nearby the camera unit 110. As shown in FIG. 1, the gateway 120 and the camera unit 110 are both located within a monitored property that is remote (and may be very far away from) the remote monitoring server 130.

In some examples, the gateway 120 may include a wireless communication device configured to exchange long range communications over a wireless data channel. In this example, the gateway 120 may transmit header data and image data over a wireless data channel. The gateway 120 may include one or more of a GSM module, a radio modem, cellular transmission module, or any type of module configured to exchange communications in one of the following formats: GSM or GPRS, CDMA, EDGE or EGPRS, EV-DO or EVDO, or UMTS.

The gateway 120 includes a buffer memory 122 that stores image data captured by the camera unit 110. The buffer memory 122 may temporarily store image data captured by the camera unit 110 to delay a decision of whether the image data (or a subset of the image data) is worthwhile to send to the remote monitoring server 130. The buffer memory 122 may be larger than the memory 112 of the camera unit 110 and, because the gateway 120 operates using an AC power source, using the buffer memory 122 to store images captured by the camera unit 110 may be more efficient. The gateway 120 also may include a display with which the stored images may be displayed to a user.

The long range wireless network 135 enables wireless communication between the gateway 120 and the remote monitoring server 130. The long range wireless network 135 may be any type of cellular network and may support any one or more of the following protocols: GSM or GPRS, CDMA, EDGE or EGPRS, EV-DO or EVDO, or UMTS. It may be relatively expensive to transmit data over the long range wireless network 135 and, therefore, the camera unit 110 and the gateway 120 may be selective in the image data transmitted to the remote monitoring server 130.

The remote monitoring server 130 receives image data from the gateway 120 over the long range wireless network 135. The remote monitoring server 130 stores the received image data and makes the image data available to one or more user devices 140 over the IP-based network 145. For instance, the remote monitoring server 130 may make the image data available to the one or more user devices 140 at a website accessible by the one or more user devices 140 over the Internet. The remote monitoring server 130 also may make the image data available to the one or more user devices 140 in an electronic message, such as an electronic mail message.

In some implementations, the remote monitoring server 130 receives the image data from the gateway 120 as a reference image and a series of differential images that indicate the difference between the corresponding image and the reference image. In these implementations, header information sent with the image data indicates which images are reference images, which images are differential images, and which reference image each differential image corresponds to. The remote monitoring server 130 processes the reference image and the differential images and converts each image into a standard image format, such as JPEG The remote monitoring server 130 then stores the converted images in a database or a file system and makes the converted images available to the one or more user devices 140.

Figure 3:
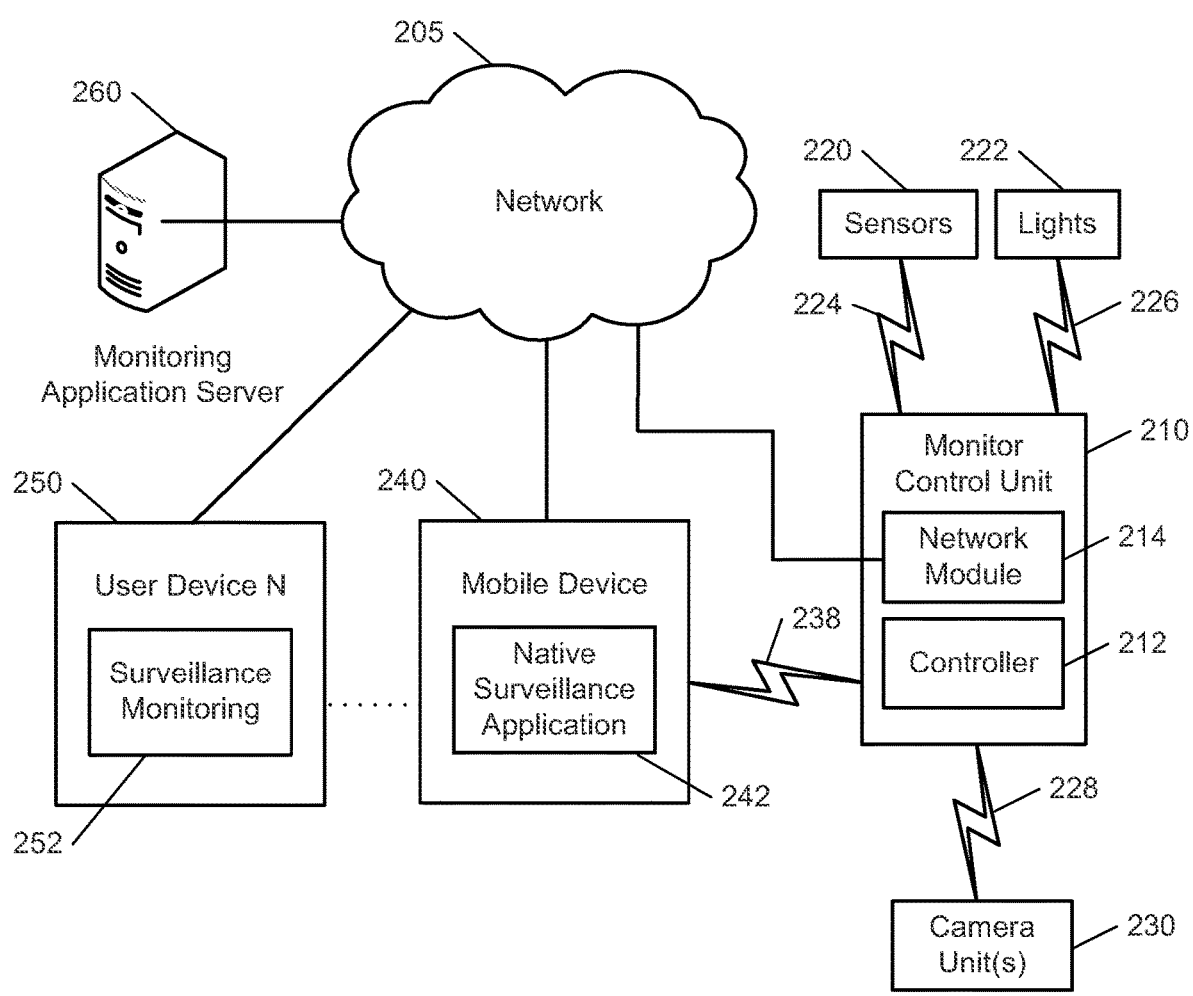

FIG. 3 illustrates an example of an electronic system 200 configured to provide surveillance and reporting. The electronic system 200 includes a network 205, a monitoring system control unit 210, one or more user devices 240, 250, and a monitoring application server 260. In some examples, the network 205 facilitates communications between the monitoring system control unit 210, the one or more user devices 240, 250, and the monitoring application server 260.

The network 205 is configured to enable exchange of electronic communications between devices connected to the network 205. For example, the network 205 may be configured to enable exchange of electronic communications between the monitoring system control unit 210, the one or more user devices 240, 250, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system control unit 210 communicates with the module 222 and the one or more camera units 230 to perform visual surveillance or monitoring. The module 222 is connected to one or more lighting systems and is configured to control operation of the one or more lighting systems. The module 222 may control the one or more lighting systems based on commands received from the monitoring system control unit 210. For instance, the module 222 may cause a lighting system to illuminate an area to provide a better image of the area when captured by one or more camera units 230.

The one or more camera units 230 may include a video/photographic camera or other type of optical sensing device configured to capture images. For instance, the one or more camera units 230 may be configured to capture images of an area within a building monitored by the monitoring system control unit 210. The one or more camera units 230 may be configured to capture single, static images of the area and also video images of the area in which multiple images of the area are captured at a relatively high frequency (e.g., thirty images per second). The one or more camera units 230 may be controlled based on commands received from the monitoring system control unit 210. Each of the one or more camera units 230 may be similar to the camera unit 110 described above with respect to FIG. 1.

The sensors 220, the module 222, and the one or more camera units 230 communicate with the controller 212 over communication links 224, 226, and 228. The communication links 224, 226, and 228 may be a wired or wireless data pathway configured to transmit signals from the sensors 220, the module 222, and the one or more camera units 230 to the controller 212. The sensors 220, the module 222, and the one or more camera units 230 may continuously transmit sensed values to the controller 212, periodically transmit sensed values to the controller 212, or transmit sensed values to the controller 212 in response to a change in a sensed value.

The communication link 228 over which the one or more camera units 230 and the controller 212 communicate may include a local network. The one or more camera units 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitoring system control unit 210 and the one or more user devices 240, 250 over the network 205. For example, the monitoring application server 260 may be configured to monitor events generated by the monitoring system control unit 210. In this example, the monitoring application server 260 may exchange electronic communications with the network module 214 included in the monitoring system control unit 210 to receive information regarding alarm events detected by the monitoring system control unit 210. The monitoring application server 260 also may receive information regarding events from the one or more user devices 240, 250.

The monitoring application server 260 may store sensor and image data received from the monitoring system and perform analysis of sensor and image data received from the monitoring system. Based on the analysis, the monitoring application server 260 may communicate with and control aspects of the monitoring system control unit 210 or the one or more user devices 240, 250.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images captured by the one or more camera units 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250 and the sensors 220, the module 222, and the one or more camera units 230. The one or more user devices 240, 250 receive data directly from the sensors 220, the module 222, and the one or more camera units 230 and sends data directly to the sensors 220, the module 222, and the one or more camera units 230. The one or more user devices 240, 250 provide the appropriate interfaces/processing to provide visual surveillance and reporting.

In other implementations, the system 200 further includes network 205 and the sensors 220, the module 222, and the one or more camera units 230 are configured to communicate sensor and image data to the one or more user devices 240, 250 over network 205 (e.g., the Internet, cellular network, etc.). In yet another implementation, the sensors 220, the module 222, and the one or more camera units 230 (or a component, such as a bridge/router) are intelligent enough to change the communication pathway from a direct local pathway when the one or more user devices 240, 250 are in close physical proximity to the sensors 220, the module 222, and the one or more camera units 230 to a pathway over network 205 when the one or more user devices 240, 250 are farther from the sensors 220, the module 222, and the one or more camera units 230. In some examples, the system leverages GPS information from the one or more user devices 240, 250 to determine whether the one or more user devices 240, 250 are close enough to the sensors 220, the module 222, and the one or more camera units 230 to use the direct local pathway or whether the one or more user devices 240, 250 are far enough from the sensors 220, the module 222, and the one or more camera units 230 that the pathway over network 205 is required. In other examples, the system leverages status communications (e.g., pinging) between the one or more user devices 240, 250 and the sensors 220, the module 222, and the one or more camera units 230 to determine whether communication using the direct local pathway is possible. If communication using the direct local pathway is possible, the one or more user devices 240, 250 communicate with the sensors 220, the module 222, and the one or more camera units 230 using the direct local pathway. If communication using the direct local pathway is not possible, the one or more user devices 240, 250 communicate with the sensors 220, the module 222, and the one or more camera units 230 using the pathway over network 205.

In some implementations, the system 200 provides end users with access to images captured by the one or more camera units 230 to aid in decision making. The system 200 may transmit the images captured by the one or more camera units 230 over a wireless WAN network to the user devices 240, 250. Because transmission over a wireless WAN network may be relatively expensive, the system 200 uses several techniques to reduce costs while providing access to significant levels of useful visual information.

For instance, the system 200 may employ monitoring schedules to determine which periods of time when a recording device (e.g., the one or more camera units 230) will be active. The monitoring schedules may be set based on user input defining when users would like the recording device (e.g., the one or more camera units 230) to be active. The monitoring schedules also may be automatically set based on monitoring past activity related to the building being monitored by the monitoring system. For example, when the monitoring system is a home alarm system, the monitoring system may detect periods of time when users are typically at home and away from home and set monitoring schedules based on the detected periods of time. In this example, the monitoring system may set the recording device (e.g., the one or more camera units 230) to be active during time periods when users are detected as typically being away from home.

In some implementations, a state of the monitoring system and other events sensed by the monitoring system may be used to enable/disable video/image recording devices (e.g., the one or more camera units 230). In these implementations, the one or more camera units 230 may be set to capture images on a periodic basis when the alarm system is armed in an "Away" state, but set not to capture images when the alarm system is armed in a "Stay" state or disarmed. In addition, the one or more camera units 230 may be triggered to begin capturing images when the alarm system detects an event, such as an alarm event, a door opening event for a door that leads to an area within a field of view of the one or more camera units 230, or motion in the area within the field of view of the one or more camera units 230. In other implementations, the one or more camera units 230 may capture images continuously, but the captured images may be stored or transmitted over a network based on the monitoring schedules discussed above.

In some examples, full-resolution, uncompressed images captured by the one or more camera units 230 may be stored locally at the monitoring system. For instance, the full-resolution, uncompressed images may be saved in the one or more camera units 230 on non-volatile memory or by transmitting the full-resolution, uncompressed images to the controller 212 for storage in non-volatile memory associated with the monitoring system control unit 210. The stored images may be full quality JPEG images.

In examples in which full-resolution, uncompressed images are stored locally at the monitoring system, if an image is captured during a time period of interest, a reduced resolution and quality image may be sent from the local system to an end user device (e.g., the user device 240 or the user device 250) for initial display to the user. The user then may retrieve the higher quality image (or information sufficient to convert a reduced resolution image to a higher quality image) from the local system if desired.

The one or more camera units 230 may be configurable as virtual sensors that sense various events monitored by a monitoring system. For example, each of the one or more camera units 230 may be trained to sense a custom event based on images captured during different states of the custom event. In this example, the one or more camera units 230 are controlled to capture images of an area where the custom event occurs prior to the custom event, during the custom event, and after the custom event. With the captured images and knowledge of the state of the custom event when the images were captured, the one or more camera units 230 may be configured to detect the custom event based on detecting a pattern of images similar to that captured during training to detect the custom event. The monitoring system then may use detection of the custom event as part of monitoring, surveillance, and reporting for the monitored property similar to how the monitoring system uses output from any other sensor, such as the sensors 220.

In some examples, the one or more camera units 230 may be configured to sense any type of event where an identifiable pattern of captured images occurs when the event occurs. In these examples, the one or more camera units 230 may be configured to virtually sense many of the events or properties sensed by the sensors 220. For instance, each of the one or more camera units 230 may be configured as a door sensor, a motion sensor, a temperature sensor, a fall detector, a smoke sensor, a camera, a light sensor, a rodent sensor, an unattended stove sensor, etc. In this regard, users may choose what type of sensor the user desires and configure a camera unit 230 as that type of sensor. Users may change the type of events sensed by the one or more camera units 230 and arrange a monitoring system that uses multiple camera units 230 to sense various events monitored by the monitoring system. In fact, a monitoring system may use only the multiple camera units 230 to sense events monitored by the monitoring system without requiring the use of the sensors 220.

As an example of configuring the one or more camera units 230 as virtual sensors, the one or more camera units 230 may be configured as door sensors. In this example, the camera is installed pointing at a door. After installation, the user/installer logs into the monitoring application server 260 and requests an image. The user/installer can then put the system into "virtual sensor learn mode." Using the image just received, the user/installer first marks anchor points (e.g., four anchor points). These anchor points are used by a camera image analysis engine to know that the camera unit has not moved. The user/installer may then use a trace tool to trace the outline of the door on the image. The camera unit then compares current images to the traced outline of the door and reports when the door is opened, left opened, opened and closed, etc. The camera unit is able to replace a door sensor, which may be located on the front door or main door where users often like to have the ability to receive an image of a person entering a property. Use of the camera unit as the door sensor instead of a traditional door contact sensor may save on installation cost and avoid modification to a frame of the door being sensed.

In addition, the one or more camera units 230 may be configured as advanced door sensors, which sense more than just door openings/closings and door position. For example, an advanced door sensor may additionally sense whether a person was coming or going when a door opening/closing event was detected. In this example, the camera unit may use InfraRed detection or image analysis when detecting the door being opened or closed to determine whether people were inside after the door closed, or outside after the door closed. This information may be used for energy management and security system functionality.

For instance, the monitoring system may, using an advanced door sensor, determine whether a person left the property after a door opening/closing event and perform light and/or thermostat control based on the determination of whether the person left the property. The monitoring system may perform energy management (e.g., turn off lights, adjust thermostat, etc.) based on a determination that the person left the property and may not perform energy management based on a determination that the person remains in the property. Further, the monitoring system may, using an advanced door sensor, determine whether a person is standing in a doorway when the door has been detected in an open position for a threshold period of time. Based on a determination that a person is standing in the doorway when the door has been detected in the open position for the threshold period of time, the monitoring system may determine not to send an alert based on the door being left open because a person is detected as standing in the doorway. Based on a determination that a person is not standing in the doorway when the door has been detected in the open position for the threshold period of time, the monitoring system may send an alert to indicate that the door has been left open.

In some implementations, the monitoring system may, using an advanced door sensor, determine whether a person opened a door from inside of the property or outside of the property. In these implementations, the advanced door sensor may analyze images of the door captured just prior to door opening to determine whether a person opening the door is detected inside of the property at the time of door opening. The monitoring system may use this information to control how an alarm event associated with the door opening is handled. For instance, when the monitoring system is armed in a "Stay" state and a door opening is detected, the monitoring system may immediately trigger a siren and begin processing an alarm event based on a determination by the advanced door sensor that the door was opened from outside of the property. When the monitoring system is armed in a "Stay" state and a door opening is detected, the monitoring system may enter a delay state in which a user is able to enter a passcode to deactivate the monitoring system prior to detecting an alarm event based on a determination by the advanced door sensor that the door was opened from inside of the property. In this regard, the advanced door sensor may enable the monitoring system to handle door openings more intelligently and, perhaps, avoid the disruption caused by activating a siren when a user inadvertently opens the door from inside of the property when the monitoring system is armed in a "Stay" state.

Further, the one or more camera units 230 may be configured as motion sensors. For instance, a camera unit may initially detect motion using the motion sensor 115 and then analyze captured images to classify the detected motion. The camera unit may output a detected motion event when the detected motion is classified as relevant (e.g., human motion) and may not output a detected motion event when the detected motion is classified as irrelevant (e.g., pet motion, motion of curtains blowing in the wind, etc.). By classifying motion using captured images, the one or more camera units 230 may provide enhanced motion sensing and may reduce false motion detections.

In examples in which the one or more camera units 230 include a thermocouple input and/or a built-in thermocouple, the one or more camera units 230 may report any time temperatures exceed thresholds, and also may report temperature data that can be used to compliment thermostat temperature data. From thermocouple measurements, the monitoring system may determine that temperature in a room with a thermostat is hotter or colder than temperature in another room by a meaningful amount. In this example, the system 100 may determine that a heating or cooling system is operating with relatively low efficiency based on a determination that temperature in a room is hotter or colder than temperature in another room by a meaningful amount. The system 100 may send an alert to a user when inefficient operation of the heating or cooling system is detected. Because the camera unit communicates wirelessly and is relatively easy to install, use of the camera unit with the thermocouple may reduce installation costs of having to connect an additional thermocouple to a thermostat.

In some implementations, the one or more camera units 230 may be configured as fall detectors. In these implementations, the monitoring system allows a user to define virtual lateral planes within captured images and then the one or more camera units 230 monitor for concurrent activity above and below the virtual lateral plane anytime motion is detected. When activity is only detected below the virtual lateral plane after detecting motion, the one or more camera units 230 may passively detect a fall.

In some examples, the one or more camera units 230 may be configured as smoke sensors. Because smoke tends to rise and dense smoke is observable to the human eye and also the one or more camera units 230, the one or more camera units 230 may have the camera pointed toward a ceiling and images captured by the camera may be analyzed for presence or absence of smoke. Similar to the process described above for configuring a door sensor, the user/installer goes into virtual sensor learn mode and builds a smoke sensor by identifying the room ceiling with the tracing tool. The camera unit then monitors for smoke near the trace. The camera unit is able to distinguish smoke from other objects (e.g., a person changing a light bulb) because smoke spreads out and looks different. The camera unit may compare current images to images of smoke previously captured to determine whether the current images are similar to known images of smoke.

In some implementations, the one or more camera units 230 may be configured as light sensors. In these implementations, the one or more camera units 230 may determine whether lights are turned on or off, determine the intensity of light in a room, and/or determine whether light is natural light or artificial light. The one or more camera units 230 may determine these characteristics of lighting in a room based on an illumination sensor (e.g., the illumination sensor 116) and/or captured images and may report on detected characteristics of lighting.

In some examples, the one or more camera units 230 may be configured as rodent or pest sensors. In these examples, when security systems are armed "Stay" and when motion sensors are typically turned off, the one or more camera units 230 may be configured to detect rodents or pests in a property. To activate the rodent or pest detection, the user/installer goes into the virtual sensor learn mode and traces the edges of a floor in the room and maybe also a counter top or other potential rodent pathways. When the user arms the system in "Stay" mode, the one or more camera units 230 may transition to a hyper-sensitive, non-reporting mode as it attempts to detect trespassing rodents or pests. The motion sensor 115 may have its sensitivity cranked up and the image analysis engine may begin to look for evidence of rodent or pest travel and may attempt to capture incriminating photos of rodent or pest presence.

In some implementations, the one or more camera units 230 may be configured as unattended stove sensors. At installation, the user/installer may plug a thermocouple mounted in stove grill hood to the camera unit via a wire connection. In this installation, the camera unit is typically at least twelve feet from the stove such that the camera unit can have appropriate perspective. The thermocouple provides the camera unit data to indicate heat intensity. The user/installer uses the "virtual sensor learn mode" to trace the stove location in a similar manner as described above with respect to configuring a door sensor. As heat intensity increases, the camera unit watches for and expects more frequent human activity around the stove. A stove with high heat intensity might need to be attended every two to three minutes while a stove with low heat intensity might only need to be attended hourly. When the camera unit does not detect human activity around the stove at an interval expected based on detected heat intensity, the camera unit may detect an unattended stove event and the monitoring system may alert the user to take preventive measures.

In some examples, one or more camera units 230 configured as virtual sensors may be learned into a control panel of a monitoring or security system. In these examples, a technician has the ability to program the control panel to receive output from one or more virtual sensors (e.g., via a wire connection or via a wireless connection, including broadband and cellular connections) and for the control panel to treat the one or more virtual sensors as if the one or more virtual sensors are regular sensors. For example, if a camera unit is configured as a virtual door sensor, the technician has the ability to program the control panel to receive output from the camera unit and cause the control panel to treat the output the same as a traditional door contact sensor. In another example, if a camera unit is configured as a virtual smoke sensor, the technician has the ability to program the control panel to receive output from the camera unit and cause the control panel to treat the output the same as a traditional smoke sensor. In some implementations, the control panel may not actually know that the sensor is a virtual sensor. To the control panel, the sensor looks real, and the control panel continues to work the same as if it had a traditional door sensor programmed. The technician is able to assign all properties with a virtual sensor, such as entry delay, arming group, partition group, etc.

Output from the one or more camera units 230 may be used in a monitoring or security system in a similar manner to other sensor data. For example, the events (e.g., custom events) detected by the one or more camera units 230 that are configured as virtual sensors may be used to detect alarm conditions and send notifications to end users. The one or more camera units 230 may communicate the output wirelessly to other devices in the monitoring or security system to enable ease of installation of the one or more camera units 230. The one or more camera units 230 also may be reconfigured at any point to sense other events or properties and additional camera units may be added to a monitoring or security system with relative ease. Accordingly, using the one or more camera units 230 as virtual sensors may provide flexibility and may allow a user to arrive at the monitoring or security system the user desires with relatively lower cost than traditional installations that use sensors adapted for only a specific purpose.

In some implementations, a single camera unit 230 may be configured as multiple virtual sensors. In these implementations, the camera unit 230 may be configured to sense multiple properties using captured images and other sensing devices included in the camera unit 230. For example, the camera unit 230 may be configured as an advanced door sensor, a motion sensor, a temperature sensor, a light sensor, and a fall detector. In this example, the camera unit 230 serves as an advanced door sensor using captured images, serves as a motion sensor using the motion sensor 115 and/or captured images, serves as a temperature sensor using a thermocouple, serves as a light sensor using the illumination sensor 116 and/or captured images, and serves as a fall detector using the motion sensor 115 and/or captured images. In this regard, the camera unit 230 may provide the monitoring or security system with information descriptive of door opening/closing in an advanced manner, motion near the door, temperature in an area near the door, light level in an area near the door, and whether a person has fallen when moving through the door. A single camera unit 230 may be configured to sense a combination of any properties described throughout this disclosure.

In some examples, the monitoring (e.g., security) system may use data from other sensors to improve accuracy of events detected using virtual sensors. In these examples, data captured by any of the sensors 220 may be combined with output from the one or more camera units 230 to provide enhanced detection and notification. For instance, when a door monitored by a camera unit configured as an advanced door sensor has a contact sensor installed as well, output from the contact sensor may be used to confirm a door opening/closing detected by the camera unit and may be used to trigger when the camera unit captures images to detect whether persons remain in the property after a door opening/closing event.

Image analysis and processing described throughout this disclosure may be performed by the one or more camera units 230 or other devices within a monitoring (e.g., security) system. For instance, the virtual sensor processing of measured properties and captured images may be performed by the one or more camera units 230 and the one or more camera units 230 may provide output when events are detected. In other examples, the virtual sensor processing of measured properties and captured images may be performed by the control unit 210 or the monitoring application server 260. In these examples, the one or more camera units 230 send sensor and image data to the control unit 210 or the monitoring application server 260 and the control unit 210 or the monitoring application server 260 determines whether events occur based on the received sensor and image data.

In some implementations, the one or more camera units 230 may be configured to detect problems in sensing the events the one or more camera units 230 are configured to sense. In these implementations, the one or more camera units 230 may be configured to detect whether the one or more camera units 230 have been moved and/or whether something is blocking the relevant field of view of the one or more camera units 230. The one or more camera units 230 may detect a change in position by examining set trace points (or other background elements) in captured images to detect changes from an installation location. The one or more camera units 230 may detect something blocking the relevant field of view of the one or more camera units 230 by detecting a change in background image that remains the same for more than a threshold period of time. The one or more camera units 230 may be configured to output alerts when problems are detected.

FIGS. 4, 8, 10, and 12 illustrate example processes. The operations of the example processes are described generally as being performed by the system 200. The operations of the example processes may be performed by one of the components of the system 200 (e.g., the monitor control unit 210, the camera unit 230, the monitoring application server 260, etc.) or may be performed by any combination of the components of the system 200. In some implementations, operations of the example processes may be performed by one or more processors included in one or more electronic devices.

Figure 4:
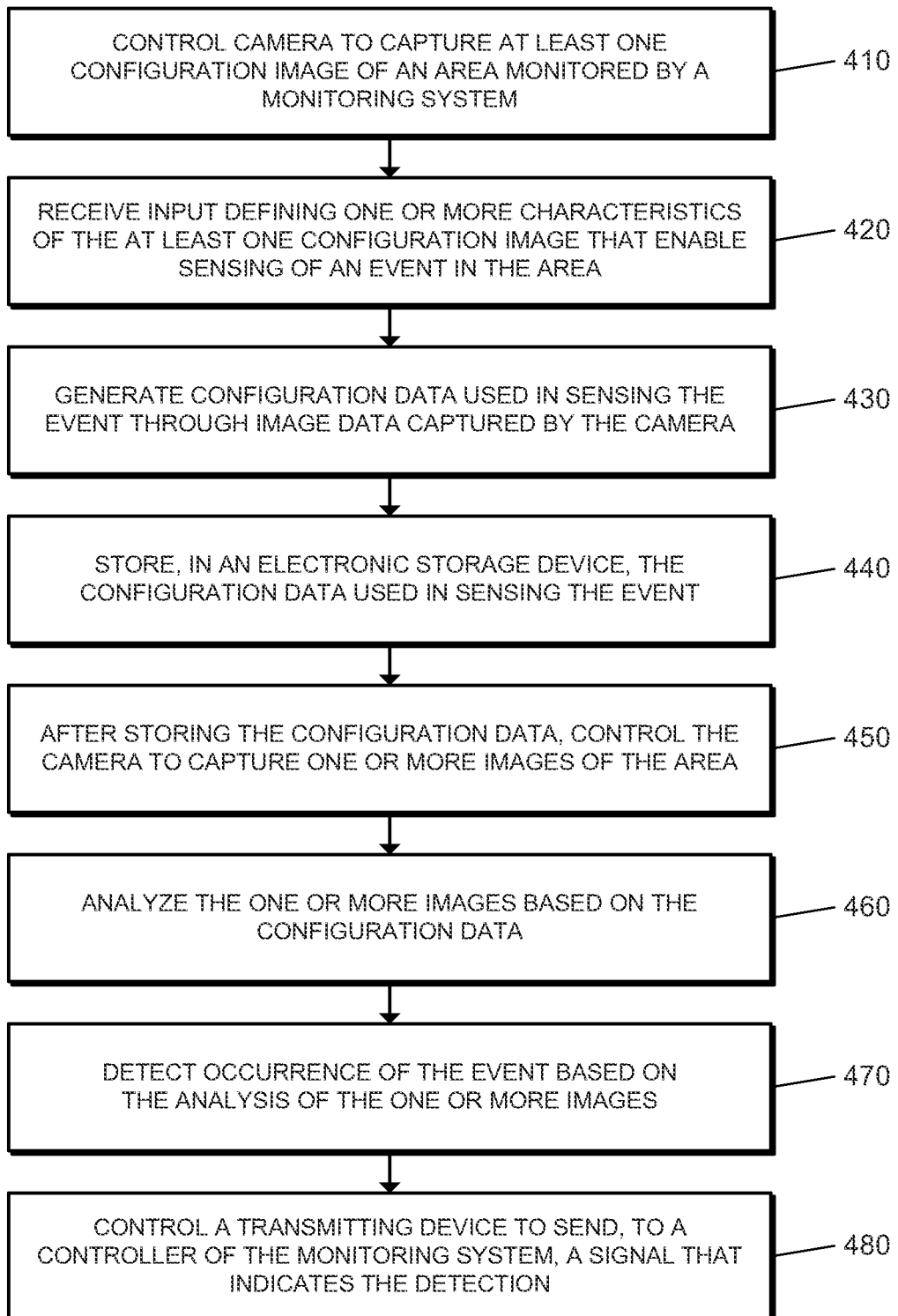
FIGS. 4, 8, 10, and 12 are flow charts of example processes.

FIG. 4 illustrates an example process 400 for detecting events using virtual sensors configured to detect custom events based on image data. The system 200 controls a camera to capture at least one configuration image of an area monitored by a monitoring system (410). For instance, the system 200 sets an image sensor in learn mode and controls the image sensor to capture an image of an area in which an event occurs. The area may be within a property monitored by the monitoring system or may be in an outdoor location monitored by the monitoring system. The area in which the event occurs may be staged prior to controlling the camera to capture the at least one configuration image to provide reference images that the system 200 may use to detect the event or various stages of the event. The system 200 may control the camera to capture multiple configuration images of the area when multiple images are needed in detecting the event or when a higher degree of accuracy is desired.

The system 200 receives input defining one or more characteristics of the at least one configuration image that enable sensing of an event in the area (420). For example, the system 200 receives user input that defines anchor points of stationary objects within the at least one configuration image and that defines an area of interest at which the event occurs within the at least one configuration image. In this example, the system 200 uses the anchor points as points of reference for locating the area of interest and determining whether the camera that captured the at least one configuration image has moved. The system 200 may analyze the area of interest to detect a custom event using the techniques described throughout this disclosure.

In some implementations, the system 200 receives user input identifying a state of the event in each configuration image. In these implementations, the system 200 compares one or more current images to the at least one configuration image and determines a state of the event in the current image as the state identified for the configuration image that matches the current image.

In some examples, the system 200 receives attribute data used in identifying an attribute of an entity (e.g., person, animal, etc.) that caused the event. In these examples, the attribute data may relate to biometric characteristics of the entity that caused the event and may enable the system 200 to determine biometric characteristics (e.g., size, shape, specific identity, etc.) of the entity that caused the event.

Figure 5:
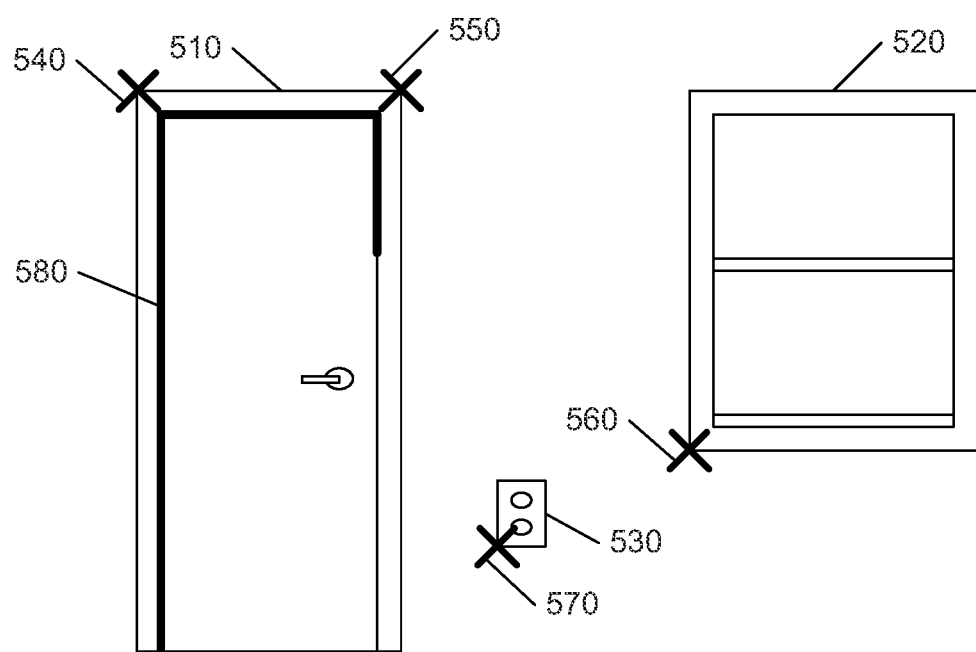
Figure 7:
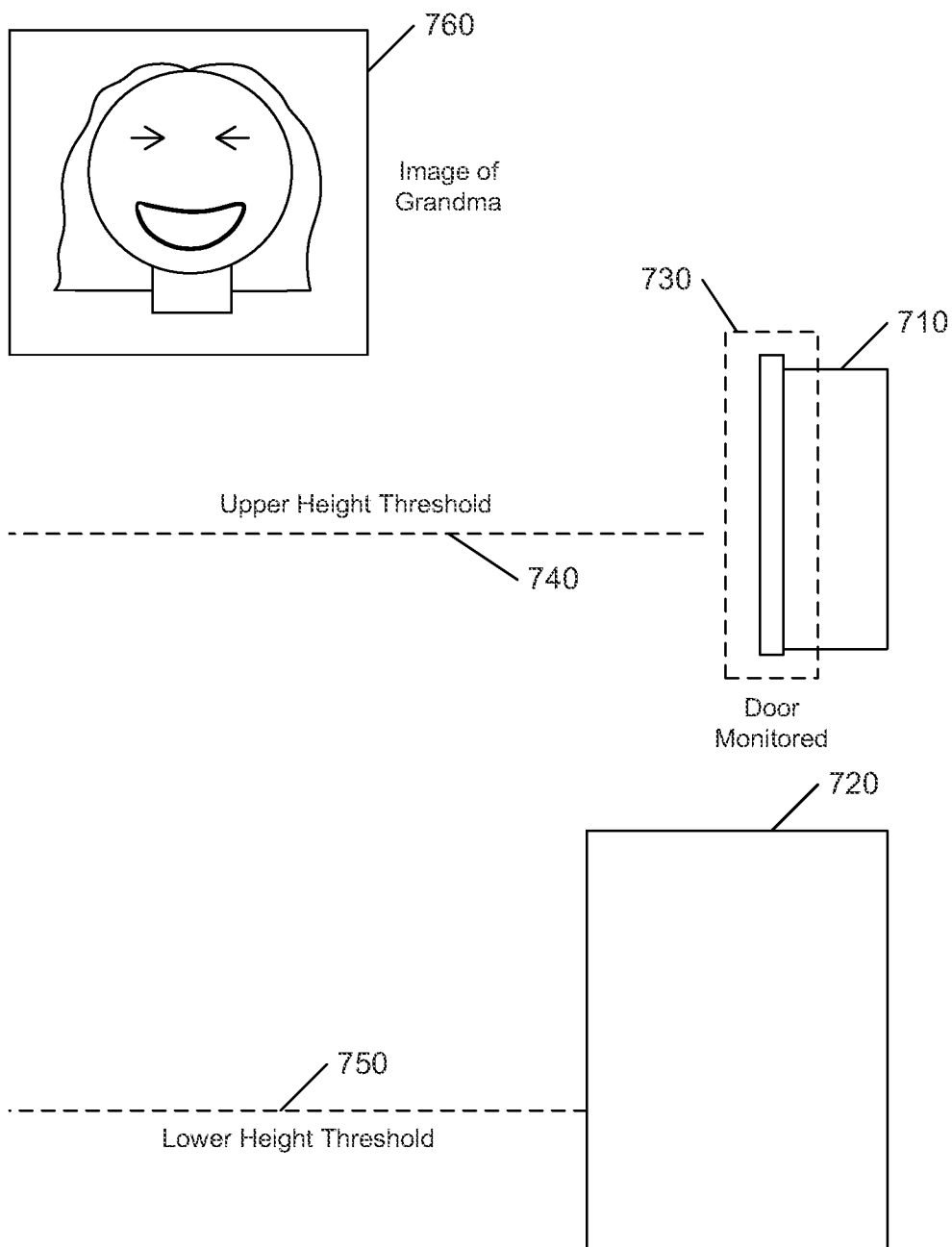

FIGS. 5-7 illustrate examples of characteristics of configuration images that are used in sensing events. In the example shown in FIG. 5, a configuration image includes a door 510, a window 520, and an outlet 530. In this example, the system 200 receives input defining anchor points 540, 550, 560, and 570 within the image. The anchor point 540 corresponds to an upper left corner of the frame of the door 510 and the anchor point 550 corresponds to an upper right corner of the frame of the door 510. The anchor point 560 corresponds to a bottom left corner of the frame of the window 520 and the anchor point 570 corresponds to a bottom left corner of the outlet 530. The anchor points 540, 550, 560, and 570 were selected to correspond to stationary elements within the configuration image. Because the anchor points 540, 550, 560, and 570 correspond to stationary elements, the system 200 is able to use the anchor points 540, 550, 560, and 570 to provide a frame of reference by identifying the features that correspond to the anchor points 540, 550, 560, and 570 within images captured at a later time. The anchor points 540, 550, 560, and 570 may be defined based on user input touching or selecting the anchor points 540, 550, 560, and 570 in a displayed version of the configuration image.

The configuration image shown in FIG. 5 also includes input defining an outline 580 of the door 510. As shown, a left-side edge, a top edge, and part of a right-side edge of the door 510 have been traced by a user configuring the image sensor that captured the configuration image. To finish configuration, the user will finish tracing the right-side edge of the door 510 to complete the outline 580 of the door 510. The outline 580 may be used in detecting whether the door 510 is oriented in an open position or a closed position based on images captured by the image sensor. In this regard, the image sensor uses the anchor points 540, 550, 560, and 570 and the outline 580 to serve as a virtual door sensor that provides output similar to a traditional door sensor that senses whether the door is open or closed based on a contact switch.

FIG. 6 illustrates a set of configuration images that each shows a different state of a door opening event. As shown, the image sensor that captured the configuration images shown in FIG. 6 is oriented above the door and captures images of a top view of the door. A first configuration image 600A shows a top view of the door in a closed configuration, a second configuration image 600B shows a top view of the door opened at a forty-five degree angle, a third configuration image 600C shows a top view of the door opened at a ninety degree angle, a fourth configuration image 600D shows a top view of the door opened at a one hundred and thirty-five degree angle, and a fifth configuration image 600E shows a top view of the door opened at a one hundred and eighty degree angle. The system 200 receives input that defines characteristics of the configuration images 600A-600E. Specifically, the system 200 receives input identifying the first configuration image 600A as showing the door in a closed configuration, receives input identifying the second configuration image 600B as showing the door opened at a forty-five degree angle, receives input identifying the third configuration image 600C as showing the door opened at a ninety degree angle, receives input identifying the fourth configuration image 600D as showing the door opened at a one hundred and thirty-five degree angle, and receives input identifying the fifth configuration image 600E as showing the door opened at a one hundred and eighty degree angle. Based on the input identifying the configuration images 600A-600E, the system 200 is able to use the configuration images 600A-600E to determine whether the door is (1) closed, (2) opened at an angle between zero and forty-five degrees, (3) opened at a forty-five degree angle, (4) opened at an angle between forty-five and ninety degrees, (5) opened at a ninety degree angle, (6) opened at an angle between ninety degrees and one hundred and thirty-five degrees, (7) opened at a one hundred and thirty-five degree angle, (8) opened at an angle between one hundred and thirty-five degrees and one hundred and eighty degrees, or (9) opened at a one hundred and eighty degree angle. In this regard, the image sensor is able to sense multiple states of door opening and provide data descriptive of door opening that is more detailed than traditional door sensors that provide only an open or closed signal.

FIG. 7 illustrates a configuration image that includes a medicine cabinet 710 and a vanity cabinet 720. In this example, the system 200 receives input defining an area of interest 730 that corresponds to a door of the medicine cabinet 710. The area of interest 730 may be used in detecting whether the door of the medicine cabinet 710 is oriented in an open position or a closed position based on images captured by the image sensor. In this regard, the image sensor uses the area of interest 730 to serve as a virtual door sensor for the medicine cabinet 710 that provides output similar to a traditional door sensor that senses whether a door is open or closed based on a contact switch.

In the configuration image shown in FIG. 7, the system 200 also receives attribute data used in identifying an attribute of an entity that caused an event. In this example, the event is opening of the door of the medicine cabinet 710 and the attribute data includes biometric data that enables the system 200 to determine biometric characteristics of the entity (e.g., person) that opened the door of the medicine cabinet 710. In this regard, the image sensor may be configured to provide more intelligence, sensing not only opening and closing of the medicine cabinet door, but also biometric characteristics of the person who opened or closed the medicine cabinet door. With the additional intelligence about the person who opened or closed the medicine cabinet door, the image sensor may detect more complex events that differentiate between which entity performed the event.

In the example shown in FIG. 7, attribute data has been provided that enables the image sensor to sense when children have opened the medicine cabinet door and when a specific user (e.g., a grandmother) has opened the medicine cabinet door. For instance, the system 200 has received input defining an upper height threshold 740 and a lower height threshold 750. The input defining the upper height threshold 740 and the lower height threshold 750 may have been provided by a user setting the upper height threshold 740 and the lower height threshold 750 by marking the configuration image at the levels where the user would like to position the upper height threshold 740 and the lower height threshold 750. The upper height threshold 740 and the lower height threshold 750 also may be set based on typical ranges of height for adult and child users or specific heights of the adults and children that reside in the property. Using the upper height threshold 740 and the lower height threshold 750, the system 200 is able to sense whether the medicine cabinet door was opened by an adult or a child. For example, the system 200 detects a body of an entity that is located near the medicine cabinet 710 at a time surrounding the event. In this example, the system 200 checks whether the detected body extends above the upper height threshold 740 and below the lower height threshold 750. Based on determining that the detected body extends above the upper height threshold 740 and below the lower height threshold 750, the system 200 determines that the entity that opened the medicine cabinet door is an adult. Based on determining that the detected body does not extend above the upper height threshold 740, the system 200 determines that the entity that opened the medicine cabinet door is a child because children are typically shorter than the height required to meet the upper height threshold 740. Based on determining that the detected body extends above the upper height threshold 740, but does not extend below the lower height threshold 750, the system 200 determines that the entity that opened the medicine cabinet door is a child because a child standing on the vanity cabinet 720 to reach the medicine cabinet door would meet the upper height threshold 740, but not the lower height threshold 750. Accordingly, using the upper height threshold 740 and the lower height threshold 750, the system 200 is able to detect whether the entity performing the event associated the medicine cabinet door is an adult or a child.

In addition, the system 200 also may receive input used in detecting a specific user. In the example shown in FIG. 7, the system 200 receives an image 760 of a grandma that the owner of the monitoring system would like to detect in relation to events at the medicine cabinet door. The image 760 may be separately uploaded to the system 200 and may not be part of the configuration image. Also, the image 760 may be captured as an additional configuration image taken of the grandma's face by the image sensor. The system 200 may use facial recognition techniques to detect when grandma performs the event associated the medicine cabinet door.

Because the example shown in FIG. 7 includes additional biometric attribute data, the image sensor that took the configuration image shown in FIG. 7 is able to sense whether the medicine cabinet door is opened or closed and, additionally, sense whether the medicine cabinet door was opened or closed by a child, the grandma, or another adult user. Although height thresholds and facial recognition techniques have been described in this example, any type of biometric attribute data may be used in configuring an image sensor to detect a custom event.

Referring again to FIG. 4, the system 200 generates configuration data used in sensing the event through image data captured by the camera (430) and stores, in an electronic storage device, the configuration data used in sensing the event (440). For example, the system 200 may generate configuration data that defines a location of anchor points set using a configuration image and defines an area of interest within the configuration image at which the event is expected to occur. In this example, the system 200 also may generate configuration data that identifies a state of an event in the configuration image in which the anchor points and the area of interest were set and store the configuration data in association with the configuration image (or portion thereof). In the example shown in FIG. 5, the system 200 generates configuration data that specifies the location of each of the anchor points 540, 550, 560, and 570 and a location of the door outline 580. The system 200 also may generate configuration data that identifies the configuration image shown in FIG. 5 as showing the door 510 oriented in a closed position and store the generated configuration data in association with the configuration image.

In some implementations, the system 200 may use multiple configuration images to sense different states of an event. In these implementations, the system 200 generates configuration data that identifies a state of the event in each configuration image (or portion thereof) and stores the identified state of the event in association with the corresponding configuration image (or portion thereof). In the example shown in FIG. 6, the system 200 generates first configuration data specifying that the first configuration image 600A shows the door in a closed configuration and stores the first configuration data in association with the first configuration image 600A. The system 200 also generates second configuration data specifying that the second configuration image 600B shows the door opened at a forty-five degree angle and stores the second configuration data in association with the second configuration image 600B. The system 200 further generates third configuration data specifying that the third configuration image 600C shows the door opened at a ninety degree angle and stores the third configuration data in association with the third configuration image 600C. In addition, the system 200 generates fourth configuration data specifying that the fourth configuration image 600D shows the door opened at a one hundred and thirty-five degree angle and stores the fourth configuration data in association with the fourth configuration image 600D. Further, the system 200 generates fifth configuration data specifying that the fifth configuration image 600E shows the door opened at a one hundred and eighty degree angle and stores the fifth configuration data in association with the fifth configuration image 600E. The system 200 then uses the first, second, third, fourth, and fifth configuration data to detect a state of the door from among the multiple, different states reflected in the configuration data.

In some examples, the system 200 generates configuration data that enables detection of one or more attributes of an entity that caused an event. In these examples, the attribute data that enables detection of one or more attributes of the entity that caused the event may relate to biometric characteristics of the entity. For instance, the attribute data may relate to a size or shape of the entity that caused the event or may include image data (e.g., a facial image) that enables identification of a specific entity performing the event. In the example shown in FIG. 7, the system 200 generates configuration data that specifies the location within the configuration image of the area of interest 730, the location within the configuration image of the upper height threshold 740, and the location within the configuration image of the lower height threshold 750. The system 200 also generates configuration data that identifies the image 760 as being a facial image of the grandma and stores the generated identification data in association with the image 760. The system 200 further may generate configuration data that identifies the configuration image shown in FIG. 7 as showing the door of the medicine cabinet 710 oriented in a closed position and store the generated configuration data in association with the configuration image.

In some implementations, the configuration data may include code or other logic needed to detect the event using captured images and the stored configuration. In these implementations, the system 200 uses the code or other logic to process new images to detect whether an event has occurred or to detect a state of the event. For instance, in the example shown in FIG. 7, the configuration data may include first code that operates to detect whether the door of the medicine cabinet 710 is open or closed in a captured image, second code that operates to detect a body within the captured image, third code that operates to detect whether the detected body meets the upper height threshold 740, fourth code that operates to detect whether the detected body meets the lower height threshold 750, fifth code that operates to detect a face of the detected body within the captured image, and sixth code that performs a facial recognition process that determines whether the detected face matches the image 760. In addition, the configuration data may define the sequence of processing the first code, second code, third code, fourth code, fifth code, and sixth code. For instance, the sequence may involve running the first code first and stopping if the result indicates that the door of the medicine cabinet 710 is closed. If the result indicates that the door of the medicine cabinet 710 is open, the sequence may specify that the second code should be run followed by running the third code and fourth code. If the result of running the third code and fourth code indicates that the entity is a child (e.g., both of the upper height threshold 740 and the lower height threshold 750 are not met), the process may be stopped and the event of a child opening the door of the medicine cabinet 710 may be detected. If the result of running the third code and fourth code indicates that the entity is an adult (e.g., both of the upper height threshold 740 and the lower height threshold 750 are met), the sequence may specify that the fifth code should be run followed by running the sixth code. If the result of running the sixth code indicates that the detected face does not match the image 760, the event of unknown adult opening the door of the medicine cabinet 710 may be detected. If the result of running the sixth code indicates that the detected face matches the image 760, the event of grandma opening the door of the medicine cabinet 710 may be detected.

Figure 10:
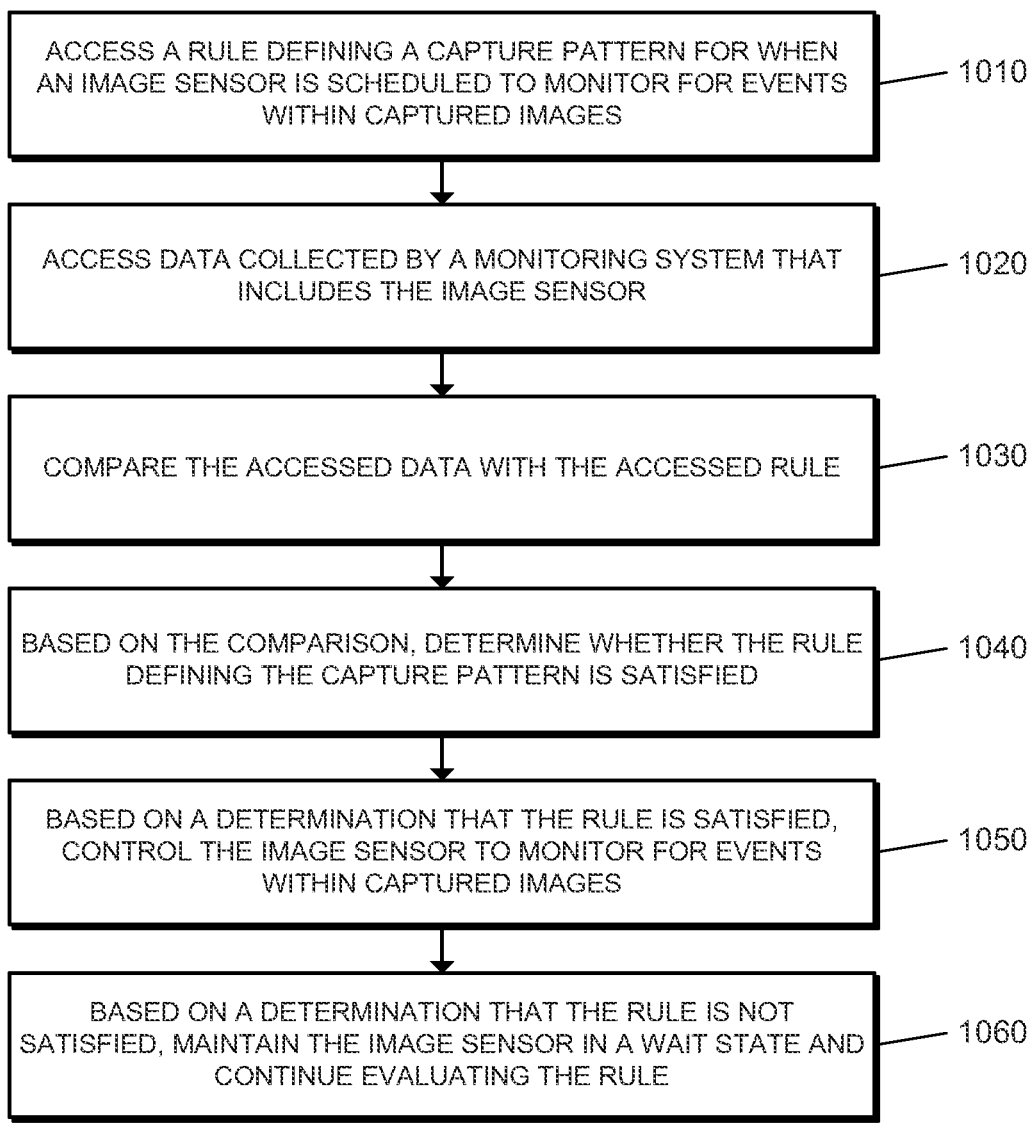

After storing the configuration data, the system 200 controls the camera to capture one or more images of the area (450). For instance, the system 200 may control the camera to periodically capture a new image. The period may be pre-set and may be variable based on a time of day or other events detected by the monitoring system. Rules may be defined to control when to trigger the camera to capture a new image or adjust the rate at which the camera captures new images. FIGS. 10 and 11, which are discussed in more detail below, describe how the system 200 may use rules to control the camera to capture one or more images of the area.

The system 200 analyzes the one or more images based on the configuration data (460) and detects occurrence of the event based on the analysis of the one or more images (470). For instance, after capturing a current image of the area in which the event occurs, the system 200 accesses the stored configuration data and performs image processing on the current image based on the accessed configuration data. When the configuration data includes code, the image processing may be performed by executing the code or executing the code in combination with other pre-defined code used in detecting events through image processing. In addition, the configuration data may define variables that are applied to the image processing to adapt the image processing to the specific event being detected. The image processing may include comparison of the current image to one or more configuration images to detect whether the current image matches or does not match the one or more configuration images. The image processing also may include processing the current image to identify features within the current image and analyzing whether the identified features indicate that the event has occurred or not.

In the example shown in FIG. 5, the system 200 accesses the configuration data that specifies the location of each of the anchor points 540, 550, 560, and 570 and the location of the door outline 580. The system 200 evaluates a location in the current image that corresponds to the location of each of the anchor points 540, 550, 560, and 570 to determine whether the features representative of the anchor points 540, 550, 560, and 570 are located correctly within the current image. Based on a determination that the features representative of the anchor points 540, 550, 560, and 570 are located correctly within the current image, the system 200 evaluates an area in the current image that corresponds to the location of the door outline 580. For instance, the system 200 may detect whether features that represent an edge of a door are present at the location of the door outline 580 and determine that the door 510 is oriented in a closed position based on detecting features that represent an edge of a door being present at locations around the door outline 580. The system 200 may determine that the door 510 is oriented in an opened position based on detecting that features that represent an edge of a door are missing at one or more locations around the door outline 580.

Based on a determination that the features representative of the anchor points 540, 550, 560, and 570 are not located correctly within the current image, the system 200 may determine that the camera has moved and signal an error condition. In addition, the system 200 may determine whether the features representative of the anchor points 540, 550, 560, and 570 have moved in a uniform manner. Based on a determination that the features representative of the anchor points 540, 550, 560, and 570 have moved in a uniform manner, the system 200 may determine to continue with an attempt to detect the event and redefine the location of the door outline 580 based on its location relative to the anchor points 540, 550, 560, and 570. As long as the redefined location of the door outline 580 remains within the current image, the system 200 evaluates an area in the current image that corresponds to the redefined location of the door outline 580 to determine whether the door 510 is oriented in an open position or a closed position.

In the example shown in FIG. 6, the system 200 accesses the first, second, third, fourth, and fifth configuration data to detect a state of the door from among the multiple, different states reflected in the configuration data. The system 200 may capture a current image and compare the current image to each of the configuration images 600A-600E. Based on the comparison, the system 200 determines whether the current image matches any of the configuration images 600A-600E and, if so, the system 200 determines which of the configuration images 600A-600E the current image matches. Based on a determination that the current image matches the configuration image 600A, the system 200 detects a state of the door as being closed. Based on a determination that the current image matches the configuration image 600B, the system 200 detects a state of the door as being opened at a forty-five degree angle. Based on a determination that the current image matches the configuration image 600C, the system 200 detects a state of the door as being opened at a ninety degree angle. Based on a determination that the current image matches the configuration image 600D, the system 200 detects a state of the door as being opened at a one hundred and thirty-five degree angle. Based on a determination that the current image matches the configuration image 600E, the system 200 detects a state of the door as being opened at a one hundred and eighty degree angle.

Based on a determination that the current image does not match any of the configuration images 600A-600E, the system 200 processes the current image to identify a location of the door in the current image and compares the location of the door in the current image to the location of the door in the configuration images 600A-600E. Based on the comparison, the system 200 determines that the location of the door in the current image falls between two of the configuration images 600A-600E. Based on a determination that the location of the door in the current image falls between the first configuration image 600A and the second configuration 600B, the system 200 detects a state of the door as being opened at an angle between zero and forty-five degrees. Based on a determination that the location of the door in the current image falls between the second configuration image 600B and the third configuration 600C, the system 200 detects a state of the door as being opened at an angle between forty-five and ninety degrees. Based on a determination that the location of the door in the current image falls between the third configuration image 600C and the fourth configuration 600D, the system 200 detects a state of the door as being opened at an angle between ninety degrees and one hundred and thirty-five degrees. Based on a determination that the location of the door in the current image falls between the fourth configuration image 600D and the fifth configuration 600E, the system 200 detects a state of the door as being opened at an angle between one hundred and thirty-five degrees and one hundred and eighty degrees.

In some implementations, the system 200 may analyze multiple images to detect an event or track a state of the event. In the example shown in FIG. 6, the system 200 may track a door opening event as the door opens through the various states represented in the configuration data. For instance, the system 200 may track the door open event as it opens through all of the states shown in the configuration images 600A to 600E and then returns through all of the states shown in the configuration images 600E to 600A. Based on this tracking of the door open event, the system 200 may determine that the door was fully opened and, therefore, it is likely that someone passed through the door during the door open event. In another instance, the system 200 may track that the door never reaches the forty-five degree angle shown in the configuration image 600B prior to returning to the closed orientation shown in the configuration image 600A. Based on this tracking, the system 200 may determine that the door was slightly opened and, therefore, it is unlikely that someone passed through the door during the door open event. By tracking the states of the door open event, the system 200 is able to detect more sophisticated data about the door open event than traditional door sensors that only detect whether the door is fully closed or not.

In examples in which the configuration data includes attribute data that enables detection of one or more attributes of an entity that caused an event, the system 200 accesses the attribute data, identifies an entity within the current image, and uses the accessed attribute data to determine whether the identified entity has the one or more attributes specified by the attribute data. As discussed above, the one or more attributes may include biometrics characteristics that reflect certain attributes of the entity, as well as biometric data that enables identification of a specific entity performing the event. In the example shown in FIG. 7, the system 200 first analyzes the area of interest 730 in a current image to determine whether the door to the medicine cabinet 710 is open or closed. Based on a determination that the door to the medicine cabinet 710 is open, the system 200 detects an entity within the current image, determines an outline for the body of the detected entity, compares the outline to the upper height threshold 740 and the lower height threshold 750, and determines whether the entity meets the upper height threshold 740 and the lower height threshold 750 based on the comparison. Based on a determination that the entity does not meet at least one of the upper height threshold 740 and the lower height threshold 750, the system 200 determines that a child has opened the door to the medicine cabinet 710 and detects the event as a child having opened the door to the medicine cabinet 710. Based on a determination that the entity meets the upper height threshold 740 and the lower height threshold 750, the system 200 detects a face of the entity in the current image, compares features of the face of the entity in the current image to features of the image 760 and determines whether the entity is the grandma based on the comparison. Based on a determination that the entity is the grandma, the system 200 determines that the grandma has opened the door to the medicine cabinet 710 and detects the event as the grandma having opened the door to the medicine cabinet 710. Based on a determination that the entity is not the grandma, the system 200 determines that an unknown adult has opened the door to the medicine cabinet 710 and detects the event as an unknown adult having opened the door to the medicine cabinet 710.

The system 200 controls a transmitting device to send, to a controller of the monitoring system, a signal that indicates the detection (480). For example, the system 200 sends a wireless or wired signal to a controller of the monitoring system to indicate the event detected. In this example, the signal may indicate a primary event (e.g., a door open event) and a secondary event (e.g., information about the entity that opened the door).

The signal also may reflect occurrence of a complex event that includes multiple conditions. For instance, in the example shown in FIG. 7, the signal may (1) indicate that the door of the medicine cabinet 710 is closed, (2) indicate that the door of the medicine cabinet 710 was opened by a child, (3) indicate that the door of the medicine cabinet 710 was opened by the grandma, or (4) indicate that the door of the medicine cabinet 710 was opened by an unknown adult.

The controller of the monitoring system may take any type of monitoring action in response to the signal. For instance, in the example shown in FIG. 7, the controller of the monitoring system may take no action based on receiving a signal indicating that the door of the medicine cabinet 710 is closed. The controller of the monitoring system may sound an audible alert within the home and send an alert to the owner of the monitoring system based on receiving a signal indicating that the door of the medicine cabinet 710 was opened by a child. The controller of the monitoring system may sound an audible alert within the home and send an alert a caregiver based on receiving a signal indicating that the door of the medicine cabinet 710 was opened by the grandma. The controller of the monitoring system may update tracking data that is reviewable by the owner of the monitoring system based on receiving a signal indicating that the door of the medicine cabinet 710 was opened by an unknown adult.

In some implementations, the controller of the monitoring system is part of a security control panel. In these implementations, sending the signal to the controller allows the image sensor to be integrated with the security control panel and allows the security control panel to benefit from events detected by the image sensor. Because traditional security control panels only currently work with absolute physical sensors, the signal sent by the transmitting is adapted to provide the same signal as an absolute physical sensor. In this regard, the security control panel perceives the event detected by the image sensor as being an event detected by an absolute physical sensor. With this configuration, the image sensor may be retrofitted within a traditional security system that uses a traditional security control panel that previously was unable to take advantage of any image-based sensing. Accordingly, unlike traditional video analytic applications, which are incompatible with security control panels, the virtual sensors described throughout this disclosure may be used with a security control panel and enable the use of image analysis to detect events for the security control panel that could previously only be detected by absolute physical sensors.

Figure 8:
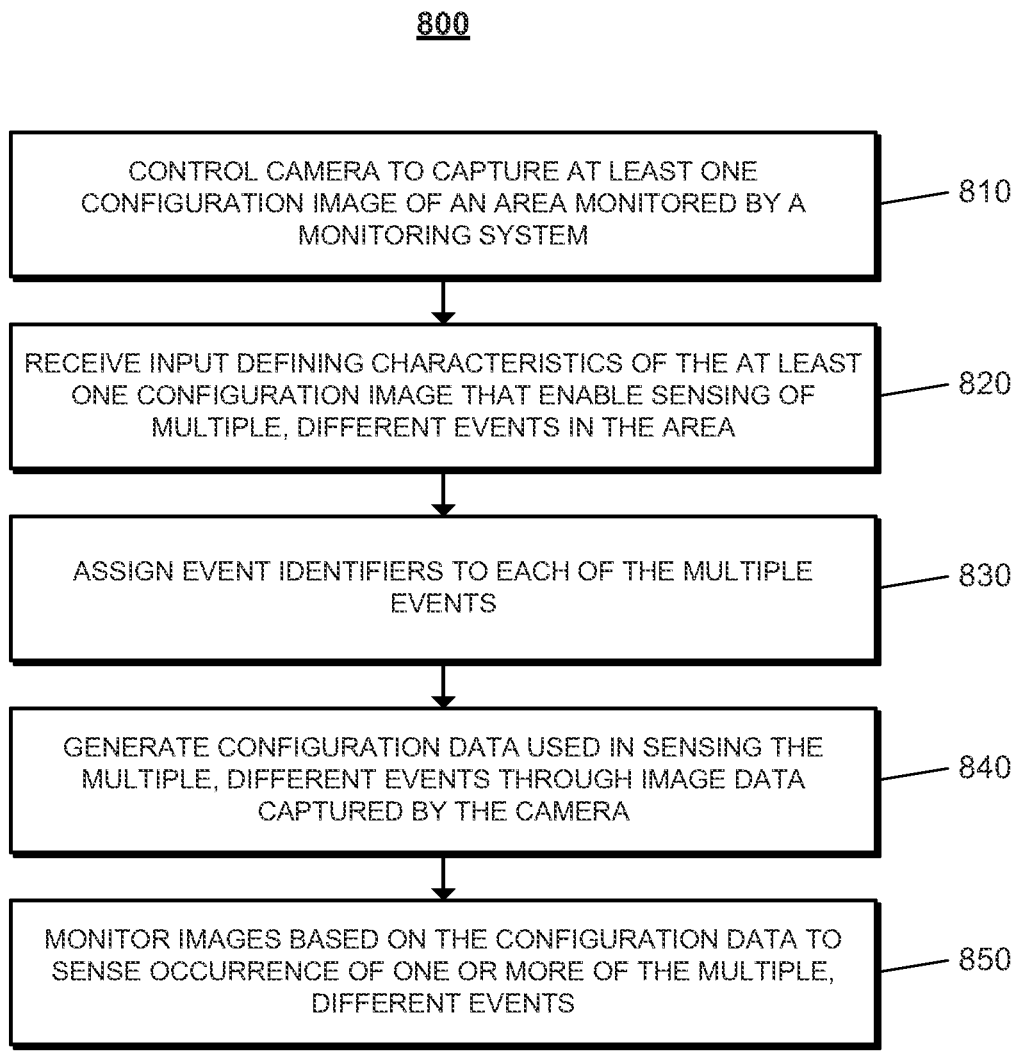

FIG. 8 illustrates an example process 800 for detecting multiple, different events using a single virtual sensor configured to detect multiple, different events based on images captured by a single camera. The system 200 controls a camera to capture at least one configuration image of an area monitored by a monitoring system (810). For example, the system 200 controls a camera to capture at least one configuration image of an area monitored by a monitoring system using techniques similar to those described above with respect to operations described in association with FIG. 4, reference numeral 410. In this example, the area monitored by the monitoring system is an area where multiple, different events of interest may be detected.

The system 200 receives input defining characteristics of the at least one configuration image that enable sensing of multiple, different events in the area (820). For example, the system 200 receives input defining characteristics of the at least one configuration image that enable sensing of multiple, different events in the area using techniques similar to those described above with respect to operations described in association with FIG. 4, reference numeral 420. In this example, the received input describes characteristics of multiple, different events of interest that occur in the area.

Figure 9:
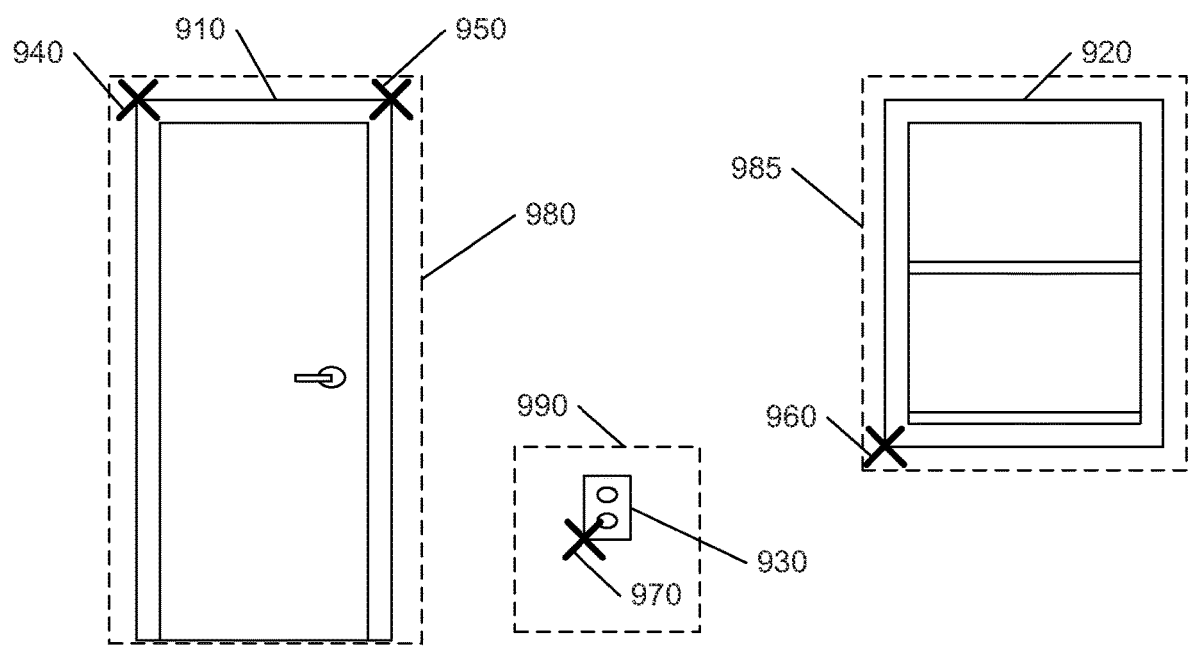
FIG. 9 illustrates an example of sensing multiple events using a single image sensor.

FIG. 9 illustrates an example of characteristics of a configuration image that are used in sensing multiple, different events. In the example shown in FIG. 9, a configuration image includes a door 910, a window 920, and an outlet 930. In this example, the system 200 receives input defining anchor points 940, 950, 960, and 970 within the image. The anchor point 940 corresponds to an upper left corner of the frame of the door 910 and the anchor point 950 corresponds to an upper right corner of the frame of the door 910. The anchor point 960 corresponds to a bottom left corner of the frame of the window 920 and the anchor point 970 corresponds to a bottom left corner of the outlet 930. The anchor points 940, 950, 960, and 970 were selected to correspond to stationary elements within the configuration image. Because the anchor points 940, 950, 960, and 970 correspond to stationary elements, the system 200 is able to use the anchor points 940, 950, 960, and 970 to provide a frame of reference by identifying the features that correspond to the anchor points 940, 950, 960, and 970 within images captured at a later time. The anchor points 940, 950, 960, and 970 may be defined based on user input touching or selecting the anchor points 940, 950, 960, and 970 in a displayed version of the configuration image. The anchor points 940, 950, 960, and 970 may be used in sensing any of the multiple, different events such that each event does not need its own set of anchor points.

In addition, the system 200 receives input defining an area of interest 980 that corresponds to the door 910. The area of interest 980 may be used in detecting whether the door 910 is oriented in an open position or a closed position based on images captured by the image sensor. In this regard, the image sensor uses the area of interest 980 to serve as a virtual door sensor for the door 910 that provides output similar to a traditional door sensor that senses whether a door is open or closed based on a contact switch. The system 200 also receives input defining an area of interest 985 that corresponds to the window 920. The area of interest 985 may be used in detecting whether the window 920 is oriented in an open position or a closed position based on images captured by the image sensor. In this regard, the image sensor uses the area of interest 985 to serve as a virtual window sensor for the window 920 that provides output similar to a traditional window sensor that senses whether a window is open or closed based on a contact switch. The system 200 further receives input defining an area of interest 990 that corresponds to the outlet 930. The area of interest 990 may be used in detecting, based on images captured by the image sensor, whether a child is near the outlet 930 and whether the plug receptacles of the outlet 930 are covered or open. Based on the above-described input, the image sensor uses the anchor points 940, 950, 960, and 970, the area of interest 980, the area of interest 985, and the area of interest 990 to serve as a virtual door sensor for the door 910, a virtual window sensor for the window 920, and a virtual outlet sensor for the outlet 930. Thus, a single image sensor with a single camera is able to sense multiple, different events that would otherwise require multiple, different pieces of equipment to sense.

The system 200 assigns event identifiers to each of the multiple events (830). For instance, the system 200 labels each of the multiple events with a unique identifier. The unique identifiers may be used to identify the configuration data that corresponds to an event of interest and provide output that is identifiable to the controller of the monitoring system. In some implementations, all data is stored in association with a unique identifier and all communications include a unique identifier. In these implementations, the event associated with the stored data and the communications may be identified using the unique identifier. In the example shown in FIG. 9, the unique identifiers may include a first unique identifier associated with opening/closing of the door 910, a second unique identifier associated with opening/closing of the window 920, and a third unique identifier associated with events related to the outlet 930.

The system 200 generates configuration data used in sensing the multiple, different events through image data captured by the camera (840). For example, the system 200 generates configuration data used in sensing the multiple, different events through image data captured by the camera using techniques similar to those described above with respect to operations described in association with FIG. 4, reference numeral 430. In this example, the configuration data is used in sensing the multiple, different events through image data captured by the single camera. The configuration data associated with each event is stored in association with the unique identifier assigned to that event. In the example shown in FIG. 9, the system 200 generates configuration data that specifies the location of each of the anchor points 940, 950, 960, and 970, a location of the area of interest 980, a location of the area of interest 985, and a location of the area of interest 990. The system 200 may store the anchor points 940, 950, 960, and 970 as generic configuration data applicable of all of the events, store the area of interest 980 in association with the first unique identifier associated with opening/closing of the door 910, store the area of interest 985 in association with the second unique identifier associated with opening/closing of the window 920, and store the area of interest 990 in association with the third unique identifier associated with events related to the outlet 930. The system 200 also may generate configuration data that identifies the configuration image shown in FIG. 9 as showing the door 910 oriented in a closed position, the window 920 oriented in a closed position, and the outlet 930 in an unoccupied and covered state. The system 200 further may store all of the generated configuration data in association with the configuration image and the unique identifiers.

The system 200 monitors images based on the configuration data to sense occurrence of one or more of the multiple, different events (850). For example, the system 200 monitors images based on the configuration data to sense occurrence of one or more of the multiple, different events using techniques similar to those described above with respect to operations described in association with FIG. 4, reference numerals 450-480. In this example, one or more images of the single camera are analyzed to detect multiple events based on the same one or more images. The multiple events may be detected simultaneously. Any of the events described throughout this disclosure may be detected by a single image sensor configured to detect multiple, different events, as long as the single image sensor captures image data sufficient to enable detection of the event. For instance, when the single image sensor includes a door, a first window, and a second window in its field of view, the single image sensor may be configured as a door sensor for the door, a window sensor for the first window, a window sensor for the second window, a glass break sensor for the first and second windows, a motion sensor for the field of view of the single image sensor, and a smoke sensor for the field of view of the single image sensor.

In some implementations, the system 200 may capture an image of the area where the multiple events occur, but only analyze the captured image for a subset of the multiple events. In these implementations, each of the multiple events is associated with a schedule and the schedule for one or more the multiple events may require checking for occurrence of the one or more events more frequently than another of the multiple events. In these implementations, even though an image exists that enables detection of the other event, the system 200 does not analyze the image for occurrence of the other event to conserve processing and/or battery power because the schedule for checking the other event indicates that detection of the other event is not presently needed.

In the example shown in FIG. 9, the system 200 analyzes the area of interest 980 in a current image to determine whether the door 910 is oriented in an open or closed position, analyzes the area of interest 985 in the current image to determine whether the window 920 is oriented in an open or closed position, and analyzes the area of interest 990 in the current image to determine whether a child is in the area near the outlet 930 and whether the plug receptacles of the outlet 930 are open or covered.

In detecting multiple, different events, the system 200 may use attribute data to identify one or more attributes of an entity associated with an event. The one or more attributes of the entity may be provided as secondary information accompanying a report of the event or may be used in detecting and reporting the event itself. Any of the techniques described throughout this disclosure to identify and use attribute data may be used in detecting multiple, different events through a single image sensor. In the example shown in FIG. 9, the system 200 uses attribute data to detect whether an adult or a child is present in an area near the outlet 930. For instance, the system 200 monitors the area of interest 990 in captured images to determine whether an entity is present within the area of interest 990 (e.g., by detecting motion in the area of interest 990). Based on detecting an entity in the area of interest 990, the system 200 evaluates the detected entity to determine a size and/or shape of the detected entity and accesses attribute data that defines typical size and/or shape biometric characteristics of how a small child would appear in the area of interest 990. The system 200 compares the determined size and/or shape of the detected entity with the typical size and/or shape biometric characteristics and, based on the comparison, determines whether the detected entity matches the typical size and/or shape biometric characteristics of a small child.

Based on a determination that the detected entity matches the typical size and/or shape biometric characteristics of a small child, the system 200 detects a child in the area near the outlet 930 and provides an alert. Based on a determination that the detected entity does not match the typical size and/or shape biometric characteristics of a small child, the system 200 detects an adult (or older child) in the area near the outlet 930 and withholds an alert.

The system 200 detects whether the plug receptacles in the outlet 930 are covered or open by comparing a current image with a background image of the outlet 930 with the plug receptacles open and determining whether the plug receptacles are present in the current image based on the comparison. When the system 200 determines that the plug receptacles are present in the current image, but that a child is not present in the area near the outlet 930, the system 200 provides a message to the owner of the monitoring system indicating that the plug receptacles are uncovered. When the system 200 determines that the plug receptacles are present in the current image and that a child is present in the area near the outlet 930, the system 200 provides a local alert (e.g., siren output), provides a local message that the plug receptacles are uncovered and a child is present near the outlet 930, and provides a remote alert to the owner of the monitoring system indicating that the plug receptacles are uncovered and a child is present near the outlet 930.

In the example shown in FIG. 9, the system 200 may analyze each captured image for all events associated with the door 910, the window 920, and the outlet 930. In this regard, the system 200 has already captured an image, so additional images do not need to be captured to evaluate all of the events. However, the system 200 uses additional processing power to analyze all events, which causes reduction in battery power if the processing is being done on an image sensor that operates on battery power. Accordingly, in some implementations, the system 200 uses a schedule of event analysis to determine when to capture an image and also which events to analyze in the captured image. For instance, when the monitoring system is armed in a "STAY" alarm mode, the system 200 may analyze each captured image for all of the events since detection of all of the events is relevant in "STAY" alarm mode. When the monitoring system is armed in an "AWAY" alarm mode, the system 200 may analyze each captured image for events associated with the door 910 and the window 920, but not for events associated with the outlet 930. Because the monitoring system is armed in the "AWAY" alarm mode, the events associated with the outlet 930 are less relevant since the property is unoccupied. Therefore, the system 200 does not waste power attempting to detect these events in the "AWAY" alarm mode. In another example, when the monitoring system is unarmed, the system 200 may analyze each captured image for events associated with the outlet 930, but not for events associated with the door 910 and the window 920. In this example, the system 200 attempts to detect the potentially dangerous events associated with the outlet 930, but disregards events associated with the door 910 and the window 920 because the monitoring system is unarmed. As illustrated through the above examples, many different scenarios and schedules may be used by the system 200 in attempting to detect multiple, different events in images captured by a single image sensor. The system 200 may use any of the schedules and event detection operations described throughout this disclosure.

FIG. 10 illustrates an example process 1000 for controlling an image sensor to monitor for events in captured images. The system 200 accesses a rule defining a capture pattern for when an image sensor is scheduled to monitor for events within captured images (1010). For instance, the system 200 accesses the rule defining the capture pattern from electronic storage. The system 200 also may receive the rule defining the capture pattern in an electronic communication.

The system 200 may access rules defining capture patterns for image sensors included in the system 200 periodically or in response to a triggering event. For instance, the system 200 may monitor for trigger events that relate to variables or conditions used in the accessed rule to determine whether to control the image sensor. The trigger events may correspond to events sensed by other sensors within the monitoring system, timer events that relate to particular times of day or time periods, external commands that request a detection attempt, or any other types of triggers that could be used to determine when to control an image sensor to monitor for events within captured images.

FIG. 11 illustrates example rules 1100 that define capture patterns for when image sensors are scheduled to monitor for events within captured images. The rules 1100 may be accessed and analyzed in determining when an image sensor is controlled to capture an image and analyze the captured image for detection of an event. As shown, the rules 1100 include a sensor column 1110 that defines the virtual sensor to which the rule pertains and a rule column 1120 that specifies the rule for the virtual sensor identified in the sensor column 1110. A first rule 1130 pertains to an image sensor configured as a virtual door sensor for the front door of a property. The first rule 1130 specifies that the virtual door sensor for the front door is scheduled to capture and analyze an image every two seconds when the monitoring system is armed in an away state. The first rule 1130 also specifies that the virtual door sensor for the front door modifies the schedule when the monitoring system is armed in a stay state, capturing and analyzing an image every second.

A second rule 1140 pertains to an image sensor configured as a virtual door sensor for a medicine cabinet within the property. The second rule 1140 specifies that the virtual door sensor for the medicine cabinet is scheduled to start capturing and analyzing images (e.g., continuously or periodically) based on detection of bedroom occupancy using output from a motion and/or door sensor positioned to sense events near or within the bedroom. The second rule 1140 also specifies that the virtual door sensor for the medicine cabinet is scheduled to stop capturing and analyzing images based on detection of bedroom vacancy using output from the motion and/or door sensor positioned to sense events near or within the bedroom.

A third rule 1150 pertains to an image sensor configured as a virtual motion sensor for an area outside of the property. The third rule 1150 specifies that, between the hours of seven in the morning and eight in the evening, the virtual motion sensor is scheduled to capture and analyze images (e.g., continuously or periodically) only based on detection of an alarm condition by the monitoring system. Between the hours of eight in the evening and seven in the morning, the third rule 1150 specifies that the virtual motion sensor is scheduled to capture and analyze images for any state of the monitoring system.

A fourth rule 1160 pertains to an image sensor configured as a primary virtual smoke sensor for the property. The primary virtual smoke sensor analyzes images of a central area of the property to determine whether smoke is present in the central area of the property. The fourth rule 1160 specifies that the primary virtual smoke sensor is scheduled to capture and analyze images (e.g., continuously or periodically) at all times.

A fifth rule 1170 pertains to an image sensor configured as a secondary virtual smoke sensor for the property. The secondary virtual smoke sensor analyzes images of a bedroom of the property to determine whether smoke is present in the bedroom of the property. The fifth rule 1170 specifies that the secondary virtual smoke sensor is scheduled to start capturing and analyzing images (e.g., continuously or periodically) based on detection of smoke by the primary virtual smoke sensor or detection of an error associated with the primary virtual smoke sensor. The fifth rule 1170 also specifies that the secondary virtual smoke sensor is scheduled to stop capturing and analyzing images based on a determination that the primary virtual smoke sensor does not detect smoke and is operating properly. By capturing and analyzing images based on detection of smoke by the primary virtual smoke sensor or detection of an error associated with the primary virtual smoke sensor, the secondary virtual smoke sensor serves as a backup to the primary virtual smoke sensor and serves to verify and/or provide more localized information for detection of smoke within the property.

Referring again to FIG. 10, the system 200 accesses data collected by a monitoring system that includes the image sensor (1020). For instance, the system 200 accesses data collected from other sensors within the monitoring system. The other sensors may include other image sensors configured as virtual sensors and traditional security monitoring sensors, such as contact door sensors, contact window sensors, motion sensors, glass break sensors, smoke sensors, temperature sensors, energy usage sensors, or any other types of sensors described throughout this disclosure or otherwise used for monitoring a condition of a property or outdoor area. The system 200 may receive and collect sensor data from the other sensors in the monitoring system.

In some implementations, the system 200 may access timing data collected by the monitoring system. In these implementations, the system 200 may access a clock operated by the system 200 to determine a current time or may receive an electronic communication from an external source that includes the current time. The system 200 also may access data from various timers that time configurable periods of time in accordance with the needs of the system 200. The system 200 may control the timers to repetitively provide output after a specific period of time has passed and may control the timers to time single events.

The system 200 compares the accessed data with the accessed rule (1030) and, based on the comparison, determines whether the rule defining the capture pattern is satisfied (1040). For instance, the system 200 compares accessed sensor data and/or accessed timing data to the conditions specified in the rule and determines whether the accessed sensor data and/or the accessed timing data meets sensor and/or timing conditions specified in the rule. When the system 200 determines that the accessed data meets the conditions in the rule, the system 200 determines that the rule defining the capture pattern is satisfied. When the system 200 determines that the accessed data meets the conditions in the rule, the system 200 determines that the rule defining the capture pattern is not satisfied.

Based on a determination that the rule is satisfied, the system 200 controls the image sensor to monitor for events within captured images (1050). For example, the system 200 may control the image sensor to start capturing and analyzing images. In this example, the rule may specify a frequency at which the image sensor captures images that depends on different conditions that result in satisfaction of the rule. In this regard, the system 200 may evaluate the different conditions that result in satisfaction of the rule, determine the appropriate frequency defined by the rule, and control the image sensor to start capturing and analyzing images at the appropriate frequency. In addition, the system 200 may control the image sensor to capture and analyze a single image or capture and analyze a pre-set number of images. The system 200 further may increase or decrease a frequency at which the image sensor captures and analyzes images.

Based on a determination that the rule is not satisfied, the system 200 maintains the image sensor in a wait state and continues evaluating the rule (1060). For instance, the system 200 does not control the image sensor to start capturing images until future evaluation of the rule indicates that the rule has been satisfied. The system 200 also may maintain the image sensor in a state of capturing and analyzing images periodically until a rule that results in stopping image capture is satisfied.

In the example rules 1100 shown in FIG. 11, the system 200 accesses sensor data and timing data to determine whether the rules are satisfied and compares the accessed data to the rules 1100. To evaluate the first rule 1130, the system 200 accesses an arming state of the monitoring system and compares the accessed arming state to the rule 1130. When the accessed arming state is unarmed, the system 200 determines that the rule 1130 is not satisfied. When the accessed arming state is "AWAY," the system 200 determines that the rule 1130 is satisfied and the frequency should be changed to every two seconds for triggering the virtual door sensor for the front door to capture and analyze an image to detect whether the front door is open or closed. When the accessed arming state is "STAY," the system 200 determines that the rule 1130 is satisfied and the frequency should be changed to every second for triggering the virtual door sensor for the front door to capture and analyze an image to detect whether the front door is open or closed. The system 200 may evaluate the rule 1130 periodically or each time the arming state of the monitoring system changes.

To evaluate the second rule 1140, the system 200 accesses a state of a motion sensor and/or a door sensor associated with a bedroom and compares the accessed state of the motion sensor and/or the door sensor to the rule 1140. When the accessed state of the motion sensor and/or the door sensor indicates that the bedroom has been entered or otherwise occupied, the system 200 determines that the rule 1140 is satisfied and starts capturing and analyzing images (e.g., continuously or periodically). When the accessed state of the motion sensor and/or the door sensor indicates that the bedroom has been exited or otherwise vacated, the system 200 determines that the rule 1140 is satisfied and stops capturing and analyzing images (e.g., continuously or periodically). When the accessed state of the motion sensor and/or the door sensor indicates that the occupancy of the bedroom has not changed, the system 200 determines that the rule 1140 is not satisfied and maintains a status of capturing and analyzing images. The system 200 may evaluate the rule 1140 periodically or each time the motion sensor and/or the door sensor detects an event.

To evaluate the third rule 1150, the system 200 accesses timing data and compares the accessed timing data to the rule 1150. When the accessed timing data indicates that the current time is between the hours of eight in the evening and seven in the morning, the system 200 determines that the rule 1150 is satisfied and starts or continues capturing and analyzing images (e.g., continuously or periodically). When the accessed timing data indicates that the current time is between the hours of seven in the morning and eight in the evening, the system 200 determines that additional information is needed and accesses alarm data that indicates whether or not an alarm condition has been detected. When the accessed alarm data indicates that an alarm condition has been detected, the system 200 determines that the rule 1150 is satisfied and starts or continues capturing and analyzing images (e.g., continuously or periodically). When the accessed alarm data indicates that an alarm condition has not been detected, the system 200 determines that the rule 1150 is not satisfied and does not capture images. The system 200 may evaluate the rule 1150 periodically and each time an alarm condition is detected.

The fourth rule 1160 specifies that the primary virtual smoke sensor is scheduled to capture and analyze images (e.g., continuously or periodically) at all times. Therefore, the system 200 does not consider sensor data or timing data in controlling capturing and analyzing images.

To evaluate the fifth rule 1170, the system 200 accesses a state of the primary virtual smoke sensor and compares the accessed state of the primary virtual smoke sensor to the rule 1170. When the accessed state of the primary virtual smoke sensor indicates that the primary virtual smoke sensor detects smoke or has entered an error condition, the system 200 determines that the rule 1170 is satisfied and starts capturing and analyzing images (e.g., continuously or periodically). When the accessed state of the primary virtual smoke sensor indicates that the primary virtual smoke sensor has stopped detecting smoke or returned from an error condition, the system 200 determines that the rule 1170 is satisfied and stops capturing and analyzing images (e.g., continuously or periodically). When the accessed state of the primary virtual smoke sensor has not changed, the system 200 determines that the rule 1170 is not satisfied and maintains a status of capturing and analyzing images. The system 200 may evaluate the rule 1170 periodically or each time the primary virtual smoke sensor changes state in terms of detecting smoke or having an error condition.

Figure 12:
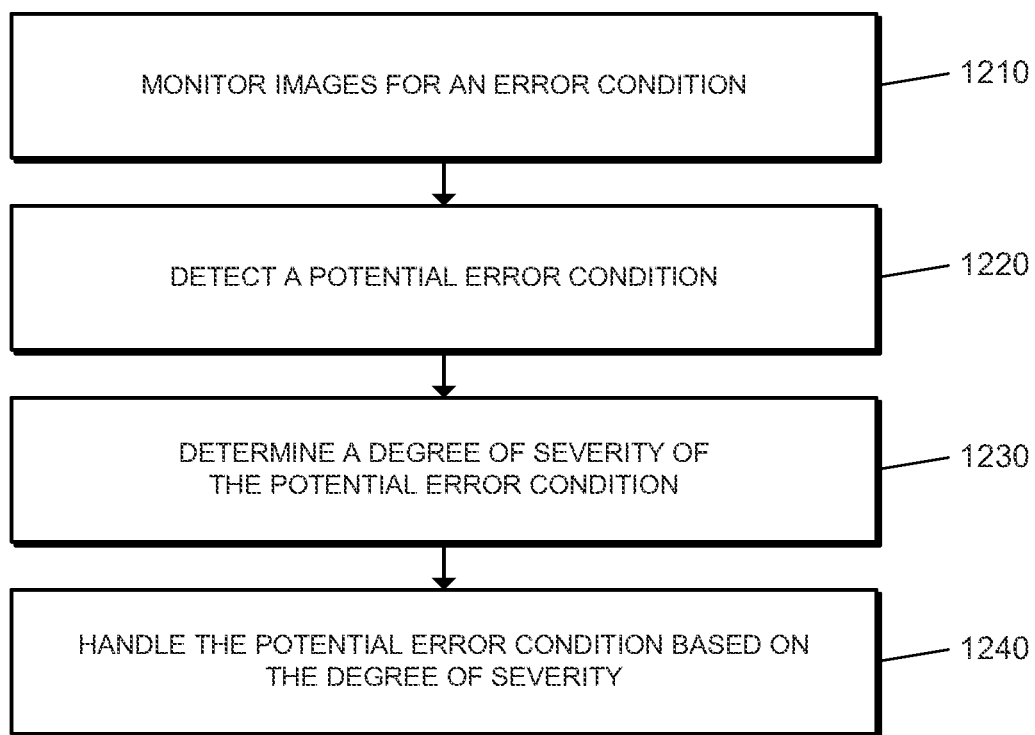

FIG. 12 illustrates an example process 1200 for handling an error condition. The system 200 monitors images for an error condition (1210). For example, each time an image is captured for detection of an event, the image is evaluated to determine whether an error condition exists. In this example, an error condition may occur when the camera has been moved or another object obstructs the camera's view of an area needed for detection of an event. The system 200 may detect whether or not the camera has been moved by determining whether features representative of predefined anchor points are located correctly within the image or by comparing the image to a preset background image and determining whether the background has changed. The system 200 may detect that another object obstructs the camera's view of an area needed for detection of an event based on an inability to detect an anchor point or an area of interest defined within the configuration data.

In some implementations, the system 200 periodically monitors for an error condition outside of capturing an image for purposes of detecting an event. In these implementations, the system 200 may control the camera to capture an image merely to detect whether an error condition exists. Because some image sensors may go relatively long periods of time between capturing images for event detection, the system 200 is able to check for potential error conditions periodically to help ensure the image sensors are ready to sense an event when needed.

The system 200 detects a potential error condition (1220). For instance, in monitoring images for an error condition, the system 200 detects that the camera has been moved or another object obstructs the camera's view of an area needed for detection of an event.

The system 200 determines a degree of severity of the potential error condition (1230). For example, the system 200 evaluates the potential error condition to determine whether detection of the event is still possible or not. In this example, the system 200 considers whether enough image data still exists to detect the event, despite the potential error condition. For instance, when the system 200 determines that an entire field of view of the camera or an entire area of interest that is essential for detecting the event has been obstructed, the system 200 classifies the error as severe because event detection is impossible. When the system 200 determines that a subset of anchor points have been obstructed and an area of interest has been partially obstructed, the system 200 classifies the error as moderate because event detection has been hampered, but still may be possible. When the system 200 determines that a subset of anchor points have been obstructed, but an area of interest remains unobstructed, the system 200 classifies the error as low because event detection has been hampered, but still is likely. Similarly, when the system 200 determines that all anchor points have moved in a uniform manner and that an area of interest relative to the anchor points is still within the image, the system 200 classifies the error as low because event detection has been hampered, but still is likely. However, when the system 200 determines that all anchor points have moved in a uniform manner and that an area of interest relative to the anchor points is outside of the image, the system 200 classifies the error as severe because event detection is impossible. When the system 200 determines that all anchor points have moved in a uniform manner and that an area of interest relative to the anchor points is partially outside of the image, the system 200 classifies the error as moderate because event detection has been hampered, but still may be possible.

The system 200 handles the potential error condition based on the degree of severity (1240). For example, the system 200 compares the degree of severity with rules defining which action to take based on the degree of severity and determines which action to take based on the comparison. In this example, each virtual sensor may have its own set of rules tailored to the potential impact of an error for that virtual sensor. In this regard, the owner of the monitoring system is able to tailor the action taken for a potential error based on the importance of the sensor and potential danger of the sensor having an error.

In some implementations, the system 200 may sound an audible alert within the property and also send an alert to a user's mobile device based on determination of a severe error. For a moderate severity error, the system 200 may not sound the audible alert within the property, but send an alert to the user's mobile device to alert the user to the moderate error condition. For a low severity error, the system 200 may not send any alerts, but update a tracked status of the monitoring system to reflect the low severity error, which enables the owner of the monitoring system to correct the error at his or her convenience the next time he or she checks the status of the monitoring system. In addition, when any type of error condition is detected, the system 200 may increase the frequency at which the system 200 checks for potential error conditions. The increased frequency enables the system 200 to learn more quickly when an error condition has been corrected or increased in severity.

Figure 13:
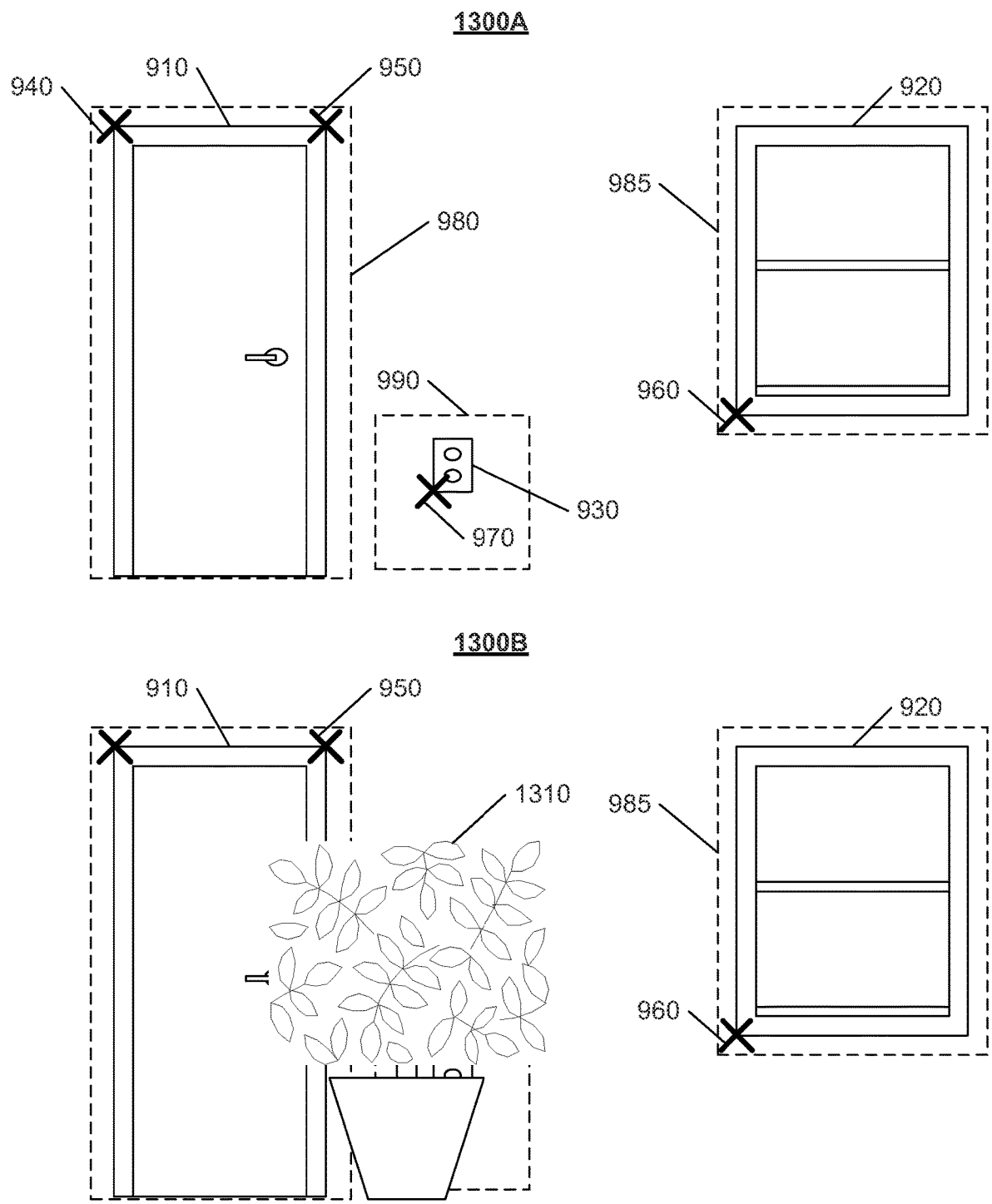
FIG. 13 illustrates an example of an error condition.

FIG. 13 illustrates an example of an error condition. As shown, a configuration image 1300A is the same as the configuration image shown in FIG. 9. For brevity, description of the elements of the configuration image shown in FIG. 9 has not been repeated here. The image 1300B shows an image of the area shown in the image 1300A, but at a future time. As shown, a plant 1310 has been placed in the field of view of the camera that captured the images 1300A and 1300B. The system 200 determines that the plant 1310 obstructs the view of the anchor point 970, obstructs a portion of the area of interest 980, and obstructs almost all of the area of interest 990. Based on this determination, the system 200 detects an error condition for each of the virtual sensor for the door 910, the virtual sensor for the window 920, and the virtual sensor for the outlet 930. Based on detecting the error condition for each of the virtual sensor for the door 910, the virtual sensor for the window 920, and the virtual sensor for the outlet 930, the system 200 determines a severity of the error condition for each of the virtual sensor for the door 910, the virtual sensor for the window 920, and the virtual sensor for the outlet 930.

For the virtual sensor for the door 910, the system 200 determines that one of four anchor points has been obstructed and only a portion of the area of interest 980 has been obstructed. With this level of obstruction, the system 200 determines the severity of the error condition as moderate because event detection has been hampered, but still may be possible. For the virtual sensor for the window 920, the system 200 determines that one of four anchor points has been obstructed and the area of interest 985 remains unobstructed. With this level of obstruction, the system 200 determines the severity of the error condition as low because event detection has been hampered, but is still likely. For the virtual sensor for the outlet 930, the system 200 determines that one of four anchor points has been obstructed and almost all of the area of interest 990 has been obstructed. With this level of obstruction, the system 200 determines the severity of the error condition as severe because event detection has become impossible.

Based on the determination of a severe error for the virtual sensor for the outlet 930, the system 200 sounds an audible alert within the property and also sends an alert to a user's mobile device. Based on the determination of a moderate error for the virtual sensor for the door 910, the system 200 does not sound the audible alert within the property, but sends an alert to the user's mobile device to alert the user to the moderate error condition. Based on the determination of a low severity error for the virtual sensor for the window 920, the system 200 may not send any alerts, but update a tracked status of the monitoring system to reflect the low severity error for the virtual sensor for the window 920.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
maintaining, by a system:
first data that that defines one or more first analysis criteria that indicate how a physical sensor of a first sensor type analyzes sensor data captured by the physical sensor given the first sensor type that generates an output from a first set of outputs, and
emulation data that defines i) one or more emulation analysis criteria that indicate how to analyze sensor data captured by the physical sensor to emulate a virtual sensor that has a second different type than the first sensor type of the physical sensor, ii) a second set of predefined outputs for the virtual sensor that has the second different type and that are different than the types of outputs from the first set of outputs for the physical sensor, and iii) an emulation action threshold that indicates a requirement for performance of one or more actions;
determining whether captured sensor data satisfies the emulation action threshold using the one or more emulation analysis criteria defined by the emulation data and the captured sensor data captured by the physical sensor, the determining comprising:
emulating, using the captured sensor data, the virtual sensor using the one or more emulation analysis criteria that indicate how to analyze sensor data captured by the physical sensor to emulate the virtual sensor, and
receiving output that was selected, during emulating of the virtual sensor and from the second set of predefined outputs, an output using the captured sensor data; and
selectively causing, using the output selected from the second set of predefined outputs, performance of the one or more actions or determining to skip causing performance of the one or more actions using a result of whether the captured sensor data satisfies the emulation action threshold.

2. The method of claim 1, comprising:
determining, by the system that has the emulation data that defines i) a trigger threshold required for emulation of the virtual sensor, ii) the one or more emulation analysis criteria that indicate how to analyze sensor data captured by the physical sensor to emulate the virtual sensor, and iii) the emulation action threshold that indicates the requirement for performance of one or more actions, that the trigger threshold is satisfied and an event occurred, wherein:
determining, using one or more emulation analysis criteria defined by the emulation data and second captured sensor data captured by the physical sensor, whether the second captured sensor data satisfies the emulation action threshold is responsive to determining that the trigger threshold is satisfied and the event has occurred.

3. The method of claim 2, wherein:
determining whether the captured sensor data satisfies the emulation analysis criteria and the event has occurred comprises determining, using the sensor data captured by a camera and the emulation data for emulation of the virtual sensor, that the captured sensor data satisfies the emulation analysis criteria and the event has occurred; and
selective causing performance or determining to skip causing performance comprises causing performance of the one or more actions.

4. The method of claim 1, comprising:
determining, using first sensor data and one or more first emulation analysis criteria defined by the emulation data, that the first sensor data does not satisfy a first emulation action criteria; and
determining, for an adjustment criteria a) for the emulation data and b) that indicates criteria under which the emulation analysis criteria for the emulation data should be changed, that the adjustment criteria is satisfied, wherein:
determining whether the sensor data satisfies the emulation action threshold comprises, in response to determining that the adjustment criteria is satisfied, determining, using the one or more emulation analysis criteria defined by the emulation data and the sensor data captured by the physical sensor, that the captured sensor data satisfies the emulation action threshold, wherein the one or more first emulation analysis criteria are different than the one or more emulation analysis criteria.

5. The method of claim 1, wherein emulating the virtual sensor comprises determining, using a stop condition defined in the emulation data, to stop analysis of additional sensor data from the physical sensor.

6. The method of claim 1, comprising:
maintaining, by the system and for each of two or more virtual sensors that include the virtual sensor, corresponding second emulation data that defines one or more respective emulation analysis criteria that indicates how to analyze sensor data captured by a respective physical sensor to emulate the respective virtual sensor, at least first emulation analysis criteria for a first virtual sensor different than second emulation analysis criteria for a second, different virtual sensor;
selecting, from the two or more virtual sensors, the second emulation data for the first virtual sensor; and
emulating, using the second captured sensor data, the first virtual sensor using the selected second emulation data for the first virtual sensor.

7. The method of claim 6, wherein the first virtual sensor has a first sensor type and the second, different virtual sensor has a second, different type.

8. The method of claim 1, comprising:
receiving data indicating that a physical sensor of the same type as the virtual sensor is inoperable; and
in response to receiving data indicating that a second physical sensor of the same type as the virtual sensor is inoperable, triggering emulation of the virtual sensor.

9. A system comprising one or more computers and one or more storage devices on which are stored instructions that are operable, when executed by the one or more computers, to cause the one or more computers to perform operations comprising:
maintaining:
first data that that defines one or more first analysis criteria that indicate how a physical sensor of a first sensor type analyzes sensor data captured by the physical sensor given the first sensor type that generates an output from a first set of outputs, and
emulation data that defines i) one or more emulation analysis criteria that indicate how to analyze sensor data captured by the physical sensor to emulate a virtual sensor that has a second different type than the first sensor type of the physical sensor, ii) a second set of predefined outputs for the virtual sensor that has the second different type and that are different than the types of outputs from the first set of outputs for the physical sensor, and iii) an emulation action threshold that indicates a requirement for performance of one or more actions;
determining whether captured sensor data satisfies the emulation action threshold using the one or more emulation analysis criteria defined by the emulation data and the captured sensor data captured by the physical sensor, the determining comprising:
emulating, using the captured sensor data, the virtual sensor using the one or more emulation analysis criteria that indicate how to analyze sensor data captured by the physical sensor to emulate the virtual sensor, and
receiving output that was selected, during emulating of the virtual sensor and from the second set of predefined outputs, an output using the captured sensor data; and
selectively causing, using the output selected from the second set of predefined outputs, performance of the one or more actions or determining to skip causing performance of the one or more actions using a result of whether the captured sensor data satisfies the emulation action threshold.

10. The system of claim 9, the operations comprising:
determining, by the system that has the emulation data that defines i) a trigger threshold required for emulation of the virtual sensor, ii) the one or more emulation analysis criteria that indicate how to analyze sensor data captured by the physical sensor to emulate the virtual sensor, and iii) the emulation action threshold that indicates the requirement for performance of one or more actions, that the trigger threshold is satisfied and an event occurred, wherein:
determining, using one or more emulation analysis criteria defined by the emulation data and second captured sensor data captured by the physical sensor, whether the second captured sensor data satisfies the emulation action threshold is responsive to determining that the trigger threshold is satisfied and the event has occurred.

11. The system of claim 10, wherein:
- determining whether the captured sensor data satisfies the emulation analysis criteria and the event has occurred comprises determining, using the sensor data captured by a camera and the emulation data for emulation of the virtual sensor, that the captured sensor data satisfies the emulation analysis criteria and the event has occurred; and
- selective causing performance or determining to skip causing performance comprises causing performance of the one or more actions.

12. The system of claim 11, wherein the virtual sensor comprises one of a door sensor, a motion sensor, or a smoke sensor.

13. The system of claim 9, the operations comprising:
- determining, using first sensor data and one or more first emulation analysis criteria defined by the emulation data, that the first sensor data does not satisfy a first emulation action criteria; and
- determining, for an adjustment criteria a) for the emulation data and b) that indicates criteria under which the emulation analysis criteria for the emulation data should be changed, that the adjustment criteria is satisfied, wherein:
- determining whether the sensor data satisfies the emulation action threshold comprises, in response to determining that the adjustment criteria is satisfied, determining, using the one or more emulation analysis criteria defined by the emulation data and the sensor data captured by the physical sensor, that the captured sensor data satisfies the emulation action threshold, wherein the one or more first emulation analysis criteria are different than the one or more emulation analysis criteria.

14. The system of claim 9, wherein emulating the virtual sensor comprises determining, using a stop condition defined in the emulation data, to stop analysis of additional sensor data from the physical sensor.

15. The system of claim 9, the operations comprising:
- maintaining, for each of two or more virtual sensors that include the virtual sensor, corresponding second emulation data that defines one or more respective emulation analysis criteria that indicates how to analyze sensor data captured by a respective physical sensor to emulate the respective virtual sensor, at least first emulation analysis criteria for a first virtual sensor different than second emulation analysis criteria for a second, different virtual sensor.

16. The system of claim 15, wherein the first virtual sensor has a first sensor type and the second, different virtual sensor has a second, different type.

17. A non-transitory computer storage medium encoded with instructions that, when executed by one or more computers, cause the one or more computers to perform operations comprising:
- maintaining, by a system;
- first data that that defines one or more first analysis criteria that indicate how a physical sensor of a first sensor type analyzes sensor data captured by the physical sensor given the first sensor type that generates an output from a first set of outputs, and
- emulation data that defines i) one or more emulation analysis criteria that indicate how to analyze sensor data captured by the physical sensor to emulate a virtual sensor that has a second different type than the first sensor type of the physical sensor, ii) a second set of predefined outputs for the virtual sensor that has the second different type and that are different than the types of outputs from the first set of outputs for the physical sensor, and iii) an emulation action threshold that indicates a requirement for performance of one or more actions;
- determining whether captured sensor data satisfies the emulation action threshold using the one or more emulation analysis criteria defined by the emulation data and the captured sensor data captured by the physical sensor, the determining comprising:
  - emulating, using the captured sensor data, the virtual sensor using the one or more emulation analysis criteria that indicate how to analyze sensor data captured by the physical sensor to emulate the virtual sensor, and
  - receiving output that was selected, during emulating of the virtual sensor and from the second set of predefined outputs, an output using the captured sensor data; and
- selectively causing, using the output selected from the second set of predefined outputs, performance of the one or more actions or determining to skip causing performance of the one or more actions using a result of whether the captured sensor data satisfies the emulation action threshold.

18. The computer storage medium of claim 17, the operations comprising:
- determining using the emulation data that defines i) a trigger threshold required for emulation of the virtual sensor, ii) the one or more emulation analysis criteria that indicate how to analyze sensor data captured by the physical sensor to emulate the virtual sensor, and iii) the emulation action threshold that indicates the requirement for performance of one or more actions, that the trigger threshold is satisfied and an event occurred, wherein:
- determining, using one or more emulation analysis criteria defined by the emulation data and second captured sensor data captured by the physical sensor, whether the second captured sensor data satisfies the emulation action threshold is responsive to determining that the trigger threshold is satisfied and the event has occurred.

19. The computer storage medium of claim 18, wherein:
- determining whether the captured sensor data satisfies the emulation analysis criteria and the event has occurred comprises determining, using the sensor data captured by a camera and the emulation data for emulation of the virtual sensor, that the captured sensor data satisfies the emulation analysis criteria and the event has occurred; and
- selective causing performance or determining to skip causing performance comprises causing performance of the one or more actions.

20. The computer storage medium of claim 19, wherein the virtual sensor comprises one of a door sensor, a motion sensor, or a smoke sensor.

* * * * *